US010386851B2

(12) United States Patent
Moore et al.

(10) Patent No.: US 10,386,851 B2
(45) Date of Patent: Aug. 20, 2019

(54) MULTI-RESOLUTION SCAN MATCHING WITH EXCLUSION ZONES

(71) Applicant: Locus Robotics Corp., Wilmington, MA (US)

(72) Inventors: Thomas Moore, Edinburgh (GB); Bradley Powers, Lowell, MA (US)

(73) Assignee: Locus Robotics Corp., Wilmington, MA (US)

( * ) Notice: Subject to any disclaimer, the term of this patent is extended or adjusted under 35 U.S.C. 154(b) by 0 days.

(21) Appl. No.: 15/712,222

(22) Filed: Sep. 22, 2017

(65) Prior Publication Data

US 2019/0094876 A1    Mar. 28, 2019

(51) Int. Cl.
| | | |
|---|---|---|
| G05D 1/02 | (2006.01) | |
| B65G 1/137 | (2006.01) | |
| B65G 1/04 | (2006.01) | |
| B25J 9/16 | (2006.01) | |
| G01C 21/20 | (2006.01) | |

(52) U.S. Cl.
CPC .......... *G05D 1/0248* (2013.01); *B25J 9/1666* (2013.01); *B65G 1/0492* (2013.01); *B65G 1/1373* (2013.01); *G01C 21/206* (2013.01); *G05D 1/024* (2013.01); *G05D 1/0257* (2013.01); *G05D 1/0274* (2013.01); *G05D 2201/0216* (2013.01)

(58) Field of Classification Search
CPC .... G05D 1/0248; G05D 1/024; G05D 1/0257; G05D 2201/0216; G05D 1/0274; B65G 1/0492; B65G 1/1373; G01C 21/206; B25J 9/1666

USPC .......................................................... 701/23
See application file for complete search history.

(56) References Cited

U.S. PATENT DOCUMENTS

| 5,006,988 A | 4/1991 | Borenstein et al. |
| 8,060,254 B2 | 11/2011 | Myeong et al. |
| (Continued) | | |

FOREIGN PATENT DOCUMENTS

EP        2045161 B1    4/2009

OTHER PUBLICATIONS

D. Fox, W. Burgard, and S. Thrun, "The Dynamic Window Approach to Collision Avoidance," in Robotics & Automation Magazine, IEEE, vol. 4, No. 1. (Mar. 1997), pp. 23-33.
(Continued)

*Primary Examiner* — Brian P Sweeney
(74) *Attorney, Agent, or Firm* — Verill Dana, LLP; John W. Powell

(57) ABSTRACT

A method for navigating a robot from a current pose to a goal pose. A map represents obstacles and free space within an area for robot navigation. A matching map pyramid and an exclusion map pyramid are constructed based on the map and decimations from a highest resolution to successively lower resolutions of the map pyramids. Current pose for navigating from a current location to a goal pose along a goal path includes determining a search area and creating a search heap. Scoring of search tasks on the search heap determines a best candidate pose at a highest resolution matching map, or expands the search heap with search tasks at the next higher resolution matching map. Expanding the search heap at the next higher resolution matching map avoids search tasks that would localize the robot in an exclusion zone.

19 Claims, 21 Drawing Sheets

(56) References Cited

U.S. PATENT DOCUMENTS

| | | | |
|---|---|---|---|
| 8,060,306 | B2 | 11/2011 | Puhalla et al. |
| 8,209,144 | B1 | 6/2012 | Anguelov et al. |
| 8,723,872 | B2 | 5/2014 | Beardsley et al. |
| 8,793,069 | B2 | 7/2014 | Kuroda |
| 9,067,320 | B2 | 6/2015 | Beardsley et al. |
| 9,082,233 | B2 | 7/2015 | Beardsley et al. |
| 9,145,286 | B2 | 9/2015 | Pfaff et al. |
| 9,216,745 | B2 | 12/2015 | Beardsley et al. |
| 9,286,810 | B2 | 3/2016 | Eade et al. |
| 9,412,173 | B2 | 8/2016 | Leonard et al. |
| 9,592,609 | B2 | 3/2017 | LaFary et al. |
| 10,108,194 | B1* | 10/2018 | Russell ............... G05D 1/0212 |
| 2011/0082585 | A1 | 4/2011 | Sofman et al. |
| 2011/0304633 | A1 | 12/2011 | Beardsley et al. |
| 2015/0284010 | A1 | 10/2015 | Beardsley et al. |
| 2016/0129907 | A1 | 5/2016 | Kim et al. |
| 2016/0363454 | A1 | 12/2016 | Hatanaka et al. |
| 2017/0270466 | A1 | 9/2017 | Kao |
| 2018/0307941 | A1* | 10/2018 | Holz ......................... B66F 9/00 |

OTHER PUBLICATIONS

Berthold K. P. Horn, "Closed-form solution of absolute orientation using unit quaternions," Journal of the Optical Society of America, 4(4), Apr. 1987, pp. 629-642.

Jur van den Berg, Stephen J. Guy, Ming Lin, and Dinesh Manocha. "Reciprocal n-body collision avoidance", in Robotics Research: The 14th International Symposium ISRR, Cédric Pradalier, Roland Siegwart, and Gerhard Hirzinger (eds.), Springer Tracts in Advanced Robotics, vol. 70, Springer-Verlag, May 2011, pp. 3-19.

Frese, Udo & Wagner, René & Röfer, Thomas. (2010). A SLAM overview from a users perspective. KI. 24. 191-198. 10.1007/s13218-010-0040-4.

Edwin Olson, "M3RSM: Many-to-many multi-resolution scan matching", Proceedings of the IEEE International Conference on Robotics and Automation (ICRA), Jun. 2015.

Edwin B. Olson, "Robust and Efficient Robotic Mapping", PhD Dissertation, Carnegie-Mellon University, 2008.

Sebastian Thrun, "Robotic Mapping: A Survey", Carnegie-Mellon University, CMU-CS-02-111, Feb. 2002.

Edwin B. Olson, "Real-Time Correlative Scan Matching", in Proceedings of the 2009 IEEE International Conference on Robotics and Automation (ICRA'09), IEEE Press, Piscataway, NJ, USA, 2009, pp. 1233-1239.

Fox D et al: "The Dynamic Window Approach to Collision Avoidance", IEEE Robotics & Automation Magazine, IEEE, Service Center, Piscataway, NJ, US, vol. 4, No. 1, Mar. 31, 1997 (Mar. 31, 1997).

International Search Report and Written Opinion, dated Mar. 1, 2019, received in international patent application No. PCT/US2018/052165, 11 pages.

Olson Edwin: "M3RSM: Many-to-many multi-resolution scan matching", 2015 IEEE International Conference on Robotics and Automation (ICRA), IEEE, May 26, 2015 (May 26, 2015), pp. 5815-5821, XP033169227, DOI: 10.1109/ICRA.2015.7140013 [retrieved on Jun. 29, 2015].

Suzuki Shintaro et al: "Initial self-localization based on shared information for multi-robot teleoperation system", The SICE Annual Conference 2013, The Society of Instrument and Control Engineers—SICE, Sep. 14, 2013 (Sep. 14, 2013), pp. 2721-2726, XP032566351, [retrieved on Feb. 10, 2014].

Jianping Xie et al: "A real-time robust global localization for autonomous mobile robots in large environments", Control Automation Robotics&Vision (ICARCV), 2010 11th International Conference on, IEEE, Dec. 7, 2010 (Dec. 7, 2010).

Yuichiro Toda et al: "Intelligent planning based on multi-resolution map for simultaneous localization and mapping", Robotic Intelligence in Informationally Structured Space (RIISS), 2011 IEEE Workshop on, IEEE, Apr. 11, 2011 (Apr. 11, 2011).

International Search Report and Written Opinion, dated Mar. 6, 2019, received in international patent application No. PCT/US2018/052190, 8 pages.

* cited by examiner

| Fiducial ID | x | y | z | quaternion.x | quaternion.y | quaternion.z | quaternion.w |
|---|---|---|---|---|---|---|---|
| 1 | -10.2 | 2.3 | 0 | 0 | 0 | 0 | 1 |
| 2 | 23.1 | 15.8 | 0 | 0 | 0 | 0 | 1 |
| 3 | 45.3 | 3.3 | 0 | 0 | 0 | -1 | 0 |

| Location | Fiducial ID |
|---|---|
| L01001A | 11 |
| L01001B | 11 |
| L01001C | 11 |
| L01001D | 11 |
| L01001E | 11 |
| L01001F | 11 |
| L01002A | 12 |
| L01002B | 12 |
| L01002C | 12 |
| L01002D | 12 |
| L01002E | 12 |
| L01003A | 13 |
| L01003B | 13 |
| L01003C | 13 |
| L01003D | 13 |
| L01003E | 13 |
| L01003F | 13 |
| L01004A | 14 |
| L01004B | 14 |
| L01004C | 14 |
| L01004D | 14 |
| L01004E | 14 |
| L01005A | 15 |
| L01005B | 15 |
| L01005C | 15 |
| L01005D | 15 |
| L01005E | 15 |
| L01005F | 15 |

FIG. 7

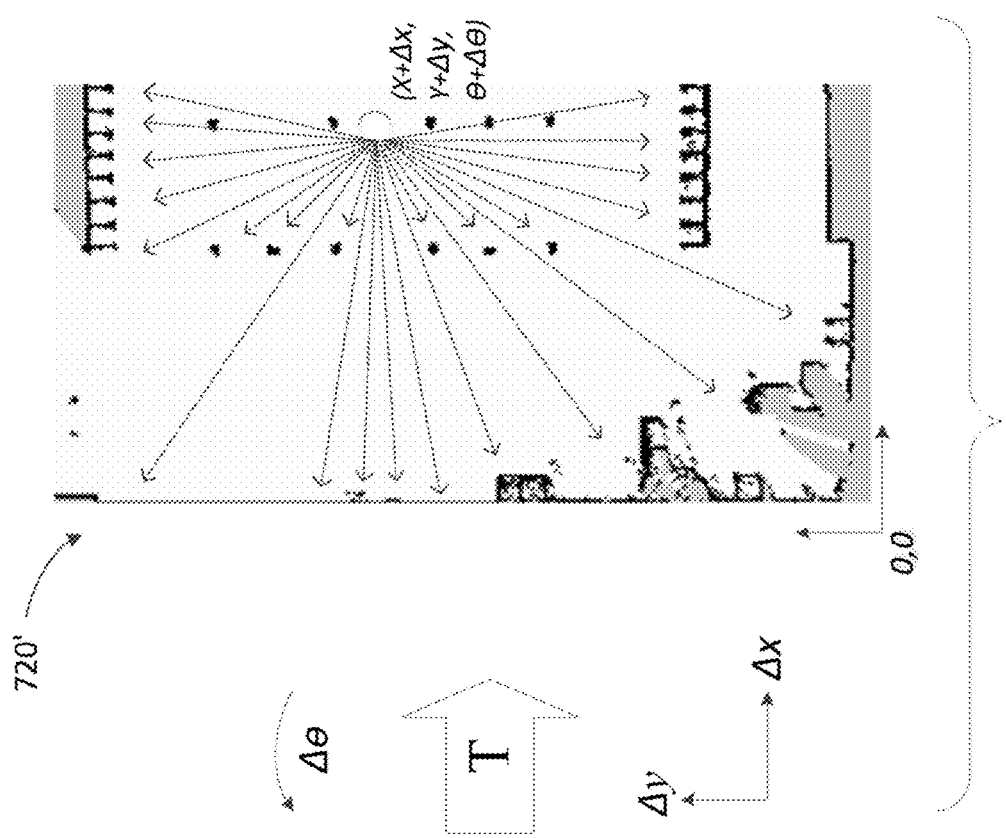
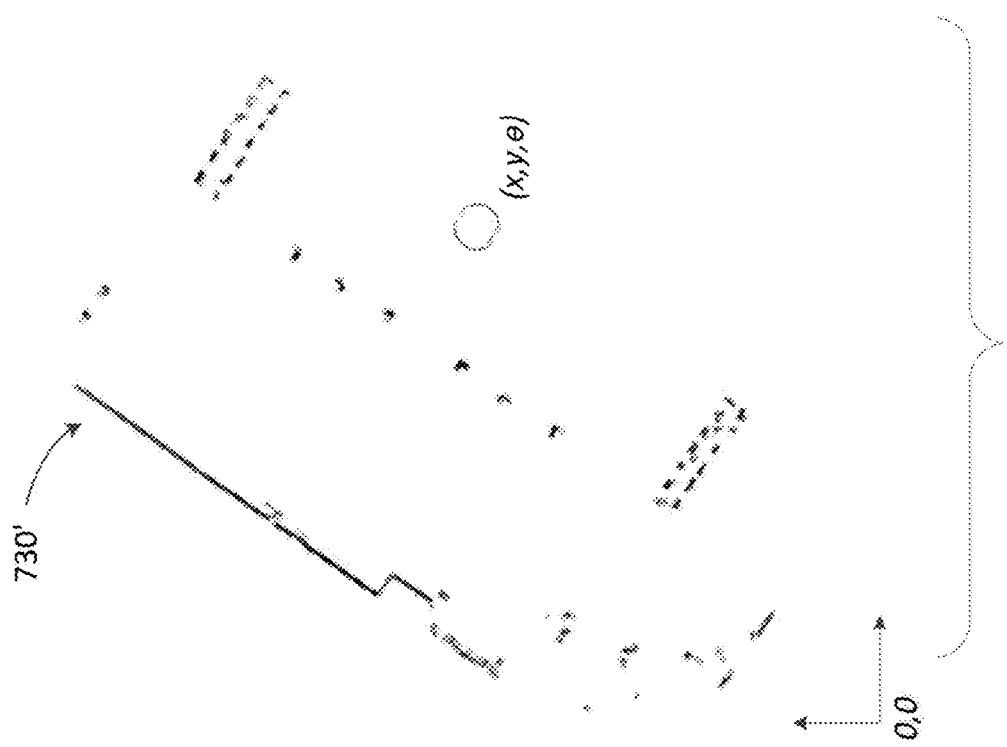
FIG. 13B
FIG. 13A

MULTI-RESOLUTION SCAN MATCHING WITH EXCLUSION ZONES

CROSS-REFERENCE TO RELATED APPLICATIONS

This application is related to U.S. application Ser. No. 15/712,256 filed Sep. 22, 2017, entitled "DYNAMIC WINDOW APPROACH USING OPTIMAL RECIPROCAL COLLISION AVOIDANCE COST-CRITIC", which is incorporated herein by reference.

FIELD OF THE INVENTION

The invention described herein relates generally to the navigation of robots to target locations using spatial representations of a dimensional space containing obstacles. Specifically, the present invention is an improved method of determining the pose of an autonomous or semi-autonomous robot operating an order fulfillment warehouse to fulfill or assist at the fulfillment of product orders.

BACKGROUND OF THE INVENTION

In many applications, robots are used to perform functions in place of humans or to assist humans in order to increase productivity and efficiency. One such application is order fulfillment, which is typically performed in a large warehouse filled with products to be shipped to customers who have placed their orders over the internet for home delivery. Fulfilling such orders in a timely, accurate and efficient manner is logistically challenging to say the least.

In an online Internet shopping application, for example, clicking the "check out" button in a virtual shopping cart creates an "order." The order includes a listing of items that are to be shipped to a particular address. The process of "fulfillment" involves physically taking or "picking" these items from a large warehouse, packing them, and shipping them to the designated address.

An important goal of the order fulfillment process is thus to ship as many items in as short a time as possible. The process of receiving an order, planning its fulfillment, finding the storage shelf or bin, picking the product, and repeating the process for each item on the order, then delivering the order to a shipping station is repetitive and labor intensive. In a warehouse stocked with thousands or tens of thousands of items of rapidly turning inventory, robots play a critical role in ensuring timely and efficient order fulfillment. In addition, the products that will ultimately be shipped first need to be received in the warehouse and stored or "placed" in storage bins in an orderly fashion throughout the warehouse so they can be readily retrieved for shipping.

Using robots to perform picking and placing functions may be done by the robot alone or with the assistance of human operators. Picking and placing or stocking functions, whether or not performed with human interaction, requires that the robot navigate from its present location to a target product storage or "bin" location. Along the robot's goal path from present location to product storage bin, the robot typically encounters stationary and moving obstacles such as walls, shelves, support structure, humans and other robots. As new product is stocked and depleted, as new shelves and bins are added and removed, and as miscellaneous objects are introduced into a shared human-robot space, the dynamic nature of an order fulfillment warehouse requires constant updating of information about the warehouse and its contents.

One method of navigation by a robot in an order fulfillment warehouse employs a spatial model or "map" of the warehouse, locally stored and updated by the robot, to allow the robot to operate autonomously or semi-autonomously as it performs its assigned order fulfillment tasks. The map is a digital representation of the warehouse, its storage locations, obstacles and other features. To arrive at a product bin in the presence of stationary and dynamic obstacles, the robot performs processing operations on the map to determine its present location and for continually recalibrating its movement along the goal path.

Various techniques may be used to create and maintain such maps, for example, using local laser scans or imaging from sensors on the robot as it navigates about the warehouse. Typically, the updating of maps in a robotic mapping application is achieved using Simultaneous Mapping and Location or "SLAM". As the name suggests SLAM finds a robot's present location while simultaneously updating its map. However, SLAM is susceptible to pose errors due to uncertainties in robot obstacle sensing, robot control and location sensing, and the mapping process itself. Conventional methods for preventing such errors are computationally expensive.

What is needed is a computationally efficient method for reducing the computation time for determining pose using SLAM maps, thus improving navigation of the robot along the goal path. Such efficiency results in faster, smoother navigation to product storage bins, thus increasing the overall throughput of the order fulfillment warehouse.

BRIEF SUMMARY OF THE INVENTION

The benefits and advantages of the present invention over existing systems will be readily apparent from the Brief Summary of the Invention and Detailed Description to follow. One skilled in the art will appreciate that the present teachings can be practiced with embodiments other than those summarized or disclosed below.

In one aspect of the invention is a method for navigating a robot from a current pose to a goal pose. The method includes receiving a map representing obstacles and free space within an area for robot navigation, constructing, based on the received map, a matching map pyramid comprising a highest resolution matching map and a set of decimated matching maps at successively lower resolutions, and constructing, based on the received map, an exclusion map pyramid comprising a highest resolution exclusion map and a set of decimated exclusion maps at successively lower resolutions. Upon the receiving and constructing, the method further includes receiving a goal pose for navigating a robot from its present location to the goal pose along a goal path, receiving a laser-radar scan comprising a point cloud representing obstacles in proximity to the robot at its present location, finding the current pose of the robot. Upon finding the current pose of the robot, the robot may be moved to a next pose on the goal path in the direction of the goal pose.

In a preferred embodiment, the finding the current pose of the robot includes determining a search area within the received map, creating a search heap comprising tasks representing candidate poses at one or more resolutions of the matching map pyramid, and scoring the search tasks on the search heap to determine a best candidate pose, such that if the best candidate pose is at the highest resolution matching map, the pose is selected as the current pose; wherein if the best candidate pose is not at the highest resolution matching map the search heap is expanded based on the best candidate pose at a next highest resolution matching map, or such that the search heap is not expanded with search tasks with candidate poses that would localize the robot in an exclusion zone of an exclusion map at the next highest resolution exclusion map.

In some embodiments, the method may include receiving a simultaneous localization and mapping (SLAM) map. The method may further include creating the search heap and scoring the search tasks is performed by many-to-many multi-resolution scan matching (M3RSM). The method may include constructing the highest resolution matching map by increasing the size of obstacles by a quadratic decay convolution filter. The method may include constructing the highest resolution exclusion map by increasing the size of obstacles based on the radius of the robot.

Further aspects of the method may include decimating to construct each successively lower resolution of the matching map pyramid by overestimating the scan match scoring in the next higher resolution matching map. The decimating to construct each successively lower resolution of the exclusion map pyramid may underestimate the exclusions zones in the next higher resolution exclusion map. Underestimating of the exclusion zones at a lower resolution exclusion map and not expanding search tasks localized in exclusions zones may advantageously prevent creating search tasks in exclusion zones at higher resolutions of the exclusion pyramid. Obstacles defined by the exclusion zones may be selected from group including, but not limited to, walls, shelving, beams, bins, and charging stations.

In one aspect of the invention is a system for navigating a robot from a current pose to a goal pose. The system may include a laser-radar scanner, a transceiver, a data storage device, and a data processor and a data storage device having instructions stored thereon for execution by the data processor. Instructions stored on the data storage device may cause the robot processor to receive a map representing obstacles and free space within an area for robot navigation, constructing, based on the received map, a matching map pyramid comprising a highest resolution matching map and a set of decimated matching maps at successively lower resolutions, and constructing, based on the received map, an exclusion map pyramid comprising a highest resolution exclusion map and a set of decimated exclusion maps at successively lower resolutions. Upon the receiving and constructing, the instructions may further include receiving a goal pose for navigating a robot from its present location to the goal pose along a goal path, receiving a laser-radar scan comprising a point cloud representing obstacles in proximity to the robot at its present location, finding the current pose of the robot. Upon finding the current pose of the robot, instructions may cause the robot may be moved to a next pose on the goal path in the direction of the goal pose.

In a preferred embodiment, the finding the current pose of the robot includes determining a search area within the received map, creating a search heap comprising tasks representing candidate poses at one or more resolutions of the matching map pyramid, and scoring the search tasks on the search heap to determine a best candidate pose, such that if the best candidate pose is at the highest resolution matching map, the pose is selected as the current pose; wherein if the best candidate pose is not at the highest resolution matching map the search heap is expanded based on the best candidate pose at a next highest resolution matching map, or such that the search heap is not expanded with search tasks with candidate poses that would localize the robot in an exclusion zone of an exclusion map at the next highest resolution exclusion map.

In some embodiments, the system may include receiving a simultaneous localization and mapping (SLAM) map. The system may further include creating the search heap and scoring the search tasks is performed by many-to-many multi-resolution scan matching (M3RSM). The method may include constructing the highest resolution matching map by increasing the size of obstacles by a quadratic decay convolution filter. The system may include constructing the highest resolution exclusion map by increasing the size of obstacles based on the radius of the robot.

Further aspects of the system may include decimating to construct each successively lower resolution of the matching map pyramid by overestimating the scan match scoring in the next higher resolution matching map. The decimating to construct each successively lower resolution of the exclusion map pyramid may underestimate the exclusions zones in the next higher resolution exclusion map. Underestimating of the exclusion zones at a lower resolution exclusion map and not expanding search tasks localized in exclusions zones may advantageously prevent creating search tasks in exclusion zones at higher resolutions of the exclusion pyramid. Obstacles defined by the exclusion zones may be selected from group including, but not limited to, walls, shelving, beams, bins, and charging stations.

These and other features of the invention will be apparent from the following detailed description and the accompanying figures.

BRIEF DESCRIPTION OF THE FIGURES

Embodiments of the present invention will now be described, by way of example only, with reference to the attached Figures, wherein:

FIG. 6 is a table of the fiducial identification to pose mapping;

FIG. 7 is a table of the bin location to fiducial identification mapping;

FIGS. 13A and 13B illustrate uses scan matching to find pose by finding the translation of a misaligned scan (13A) to an aligned scan (13B);

DETAILED DESCRIPTION OF THE INVENTION

Figure 1:
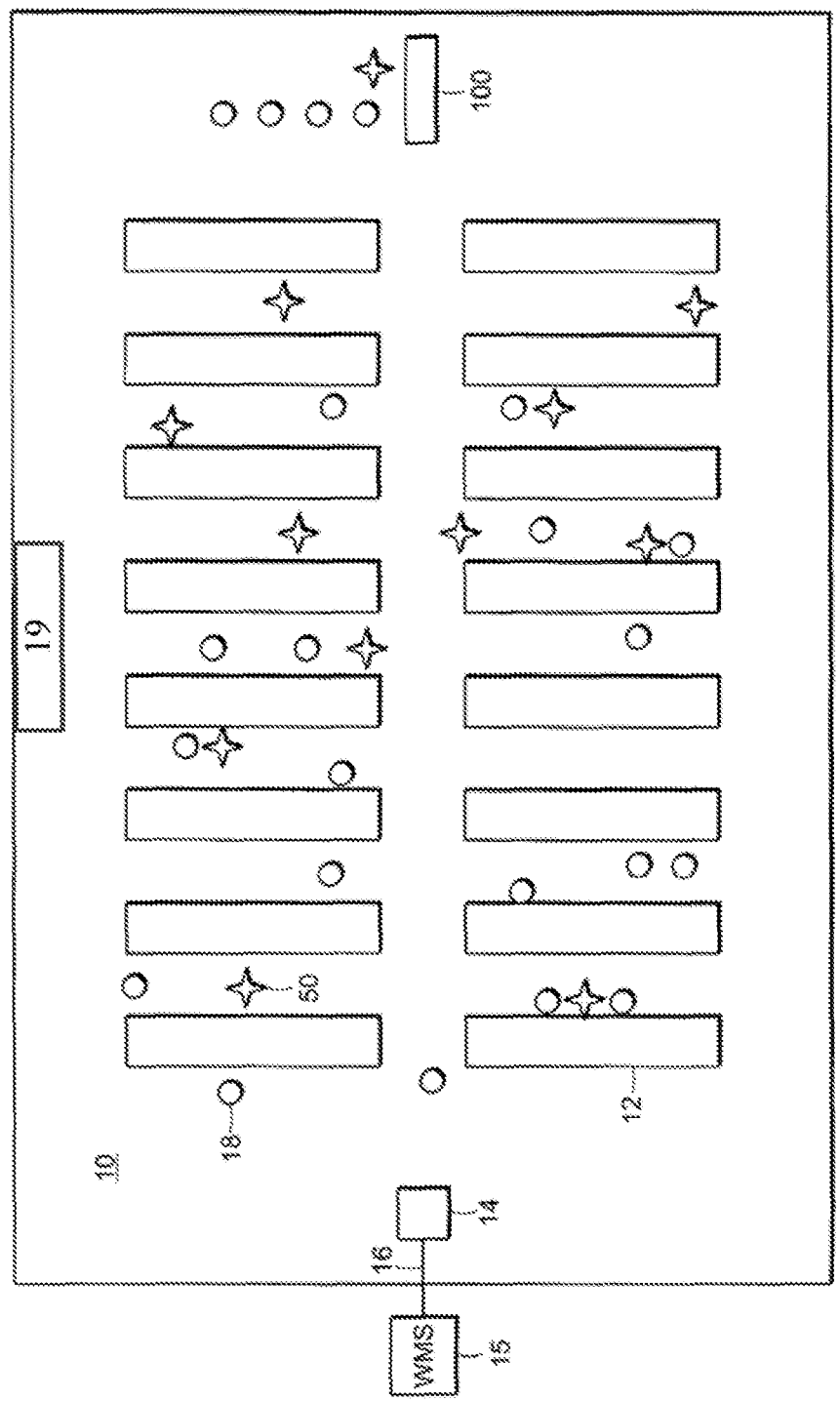
FIG. 1 is a top plan view of an order-fulfillment warehouse.

The invention described herein is directed to methods and systems for use with an autonomous or semi-autonomous robot for improved navigation of the robot from a current location to a target location along its "goal path", within an environment containing obstacles and free space.

Specifically, the methods and systems of the present invention provide a computationally efficient improvement over the prior art for accurately determining the present position and orientation or "pose" of the robot within a spatial environment. Having determined its pose quickly and accurately, the robot may better control its movement along the goal path, avoiding obstacles and allowing the robot to more directly and more smoothly among obstacles in the environment. Furthermore, the reduced processing time required by the pose determination frees up computational resources for other tasks performed by the robot during an allotted processing cycle time.

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Moreover, it is noted that like reference numerals represent similar parts throughout the several views of the drawings.

Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure.

One skilled in the art will appreciate that the present teachings can be practiced with embodiments other than those disclosed. While the description provided herein is focused on picking items from bin locations in the warehouse to fulfill an order for shipment to a customer, the system is equally applicable to the storage or placing of items received into the warehouse in bin locations throughout the warehouse for later retrieval and shipment to a customer. The invention is also applicable to inventory control tasks associated with such a warehouse system, such as, consolidation, counting, verification, inspection and clean-up of products.

The methods and systems of the present invention may also be applied in other types of environments with other types of obstacles for other types of applications. Any physical object or structure, stationary or dynamic, may be considered an "obstacle" in an application of the present invention. Obstacles may further include humans and other robots operating within the environment, and the location of the humans and other robots may be current locations or target locations in the performance of cooperative tasks. Target locations may include one or more locations within the environment for positioning one or more robots to perform or to assist a human in the performance of a task or succession of tasks.

These and other benefits and advantages will become readily apparent from the examples and illustrations described below.

Referring to FIG. 1, a typical order fulfillment warehouse 10 includes shelves 12 filled with the various items that could be included in an order 16. In operation, the order 16 from warehouse management server 15 arrives at an order-server 14. The order-server 14 communicates the order 16 to a robot 18 selected from a plurality of robots that roam the warehouse 10. Also shown is charging area 19, which is where one or more charging stations according to an aspect of the invention may be located.

Figure 2A:
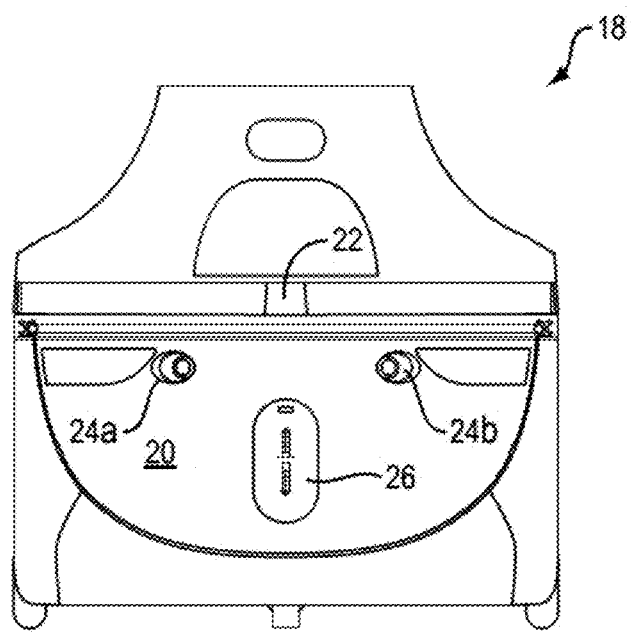
FIG. 2A is a front elevational view of a base of one of the robots used in the warehouse shown in FIG. 1.
Figure 2B:
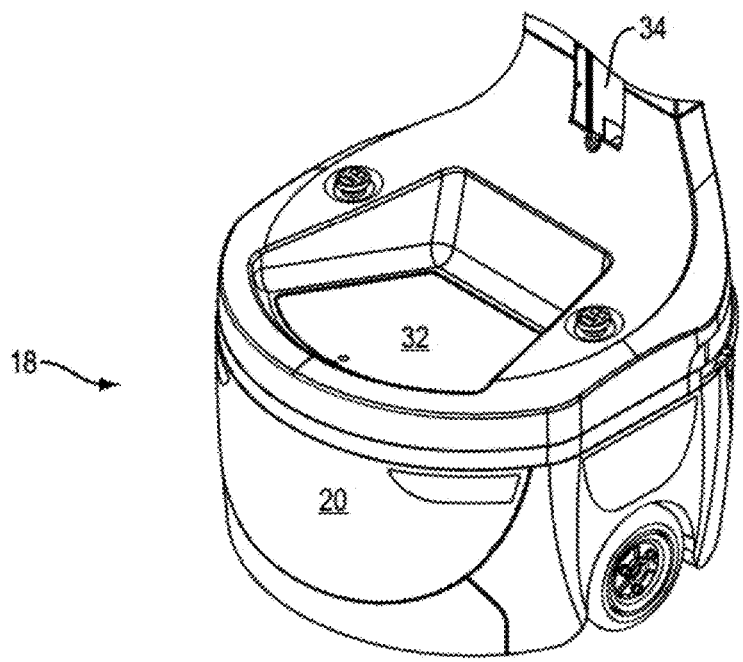
FIG. 2B is a perspective view of a base of one of the robots used in the warehouse shown in FIG. 1.
Figure 3:
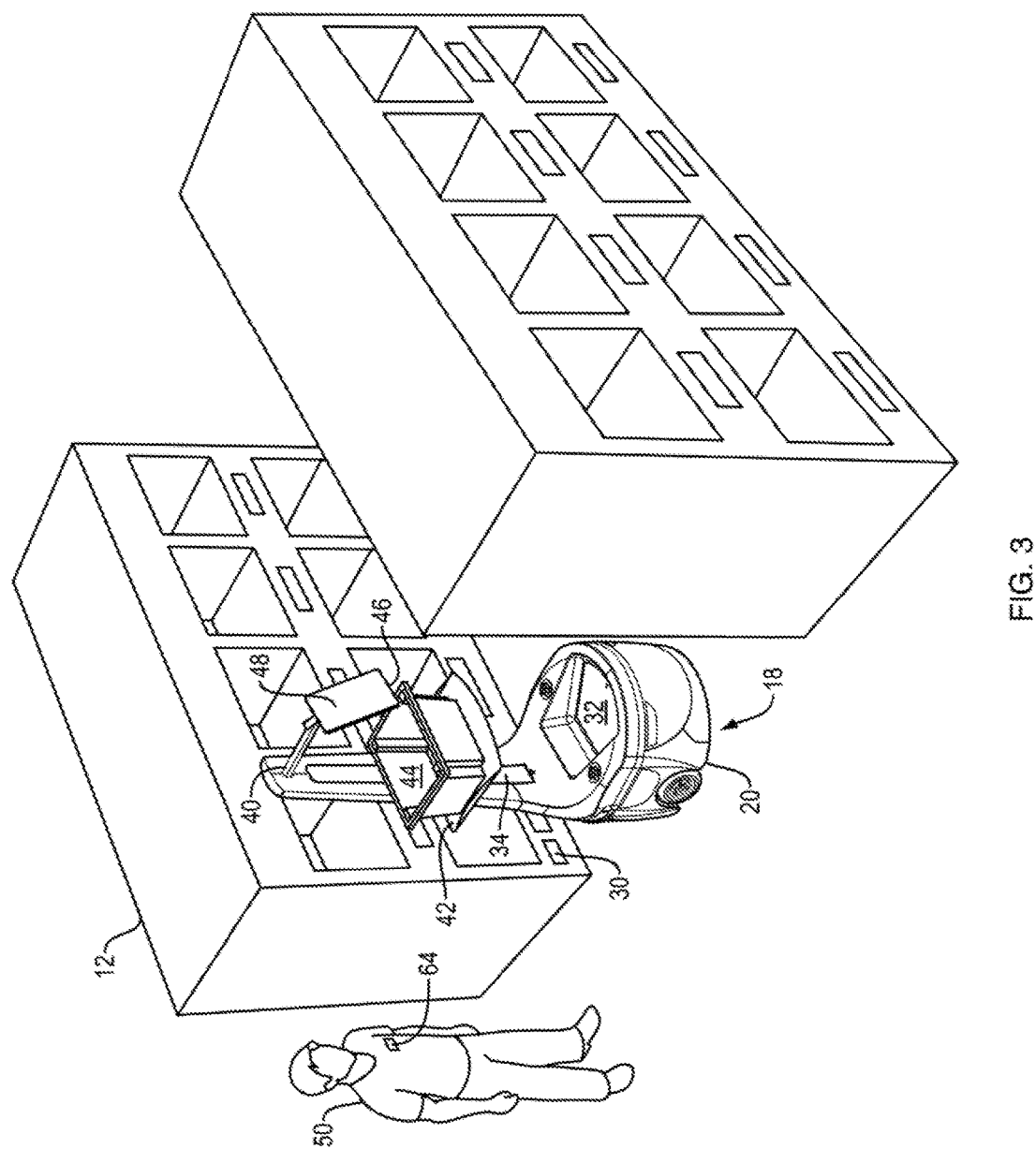
FIG. 3 is a perspective view of the robot in FIGS. 2A and 2B outfitted with an armature and parked in front of a shelf shown in FIG. 1.

In a preferred embodiment, a robot 18, shown in FIGS. 2A and 2B, includes an autonomous wheeled base 20 having a laser-radar 22. The base 20 also features a transceiver (not shown) that enables the robot 18 to receive instructions from the order-server 14, and a pair of digital optical cameras 24a and 24b. The robot base also includes an electrical charging port 26 for re-charging the batteries which power autonomous wheeled base 20. The base 20 further features a processor (not shown) that receives data from the laser-radar 22 and cameras 24a and 24b to capture information representative of the robot's environment. There is a memory (not shown) that operates with the processor to carry out various tasks associated with navigation within the warehouse 10, as well as to navigate to fiducial marker 30 placed on shelves 12, as shown in FIG. 3. Fiducial marker 30 (e.g. a two-dimensional bar code) corresponds to bin/location of an item ordered. The navigation approach of this invention is described in detail below with respect to FIGS. 4-8. Fiducial markers are also used to identify charging stations according to an aspect of this invention and the navigation to such charging station fiducial markers is the same as the navigation to the bin/location of items ordered. Once the robots navigate to a charging station, a more precise navigation approach is used to dock the robot with the charging station and such a navigation approach is described below.

Referring again to FIG. 2B, base 20 includes an upper surface 32 where a tote or bin could be stored to carry items. There is also shown a coupling 34 that engages any one of a plurality of interchangeable armatures 40, one of which is shown in FIG. 3. The particular armature 40 in FIG. 3 features a tote-holder 42 (in this case a shelf) for carrying a tote 44 that receives items, and a tablet holder 46 (or laptop/other user input device) for supporting a tablet 48. In some embodiments, the armature 40 supports one or more totes for carrying items. In other embodiments, the base 20 supports one or more totes for carrying received items. As used herein, the term "tote" includes, without limitation, cargo holders, bins, cages, shelves, rods from which items can be hung, caddies, crates, racks, stands, trestle, containers, boxes, canisters, vessels, and repositories.

Although robot 18 excels at moving around the warehouse 10, with current robot technology, it is not very good at quickly and efficiently picking items from a shelf and placing them in the tote 44 due to the technical difficulties associated with robotic manipulation of objects. A more efficient way of picking items is to use a local operator 50, which is typically human, to carry out the task of physically removing an ordered item from a shelf 12 and placing it on robot 18, for example, in tote 44. The robot 18 communicates the order to the local operator 50 via the tablet 48 (or laptop/other user input device), which the local operator 50 can read, or by transmitting the order to a handheld device used by the local operator 50.

Upon receiving an order 16 from the order server 14, the robot 18 proceeds to a first warehouse location, e.g. as shown in FIG. 3. It does so based on navigation software stored in the memory and carried out by the processor. The navigation software relies on data concerning the environment, as collected by the laser-radar 22, an internal table in memory that identifies the fiducial identification ("ID") of fiducial marker 30 that corresponds to a location in the warehouse 10 where a particular item can be found, and the cameras 24a and 24b to navigate.

Upon reaching the correct location, the robot 18 parks itself in front of a shelf 12 on which the item is stored and waits for a local operator 50 to retrieve the item from the shelf 12 and place it in tote 44. If robot 18 has other items to retrieve it proceeds to those locations. The item(s) retrieved by robot 18 are then delivered to a packing station 100, FIG. 1, where they are packed and shipped.

It will be understood by those skilled in the art that each robot may be fulfilling one or more orders and each order may consist of one or more items. Typically, some form of route optimization software would be included to increase efficiency, but this is beyond the scope of this invention and is therefore not described herein.

In order to simplify the description of the invention, a single robot 18 and operator 50 are described. However, as is evident from FIG. 1, a typical fulfillment operation includes many robots and operators working among each other in the warehouse to fill a continuous stream of orders.

The navigation approach of this invention, as well as the semantic mapping of a SKU of an item to be retrieved to a fiducial ID/pose associated with a fiducial marker in the warehouse where the item is located, is described in detail below with respect to FIGS. 4-8. As noted above, the same navigation approach may be used to enable the robot to navigate to a charging station in order to recharge its battery.

Using one or more robots 18, a map of the warehouse 10 must be created and dynamically updated to determine the location of objects, both static and dynamic, as well as the locations of various fiducial markers dispersed throughout the warehouse. To do this, one of the robots 18 navigate the warehouse and build/update a map 10a, FIG. 4, utilizing its laser-radar 22 and simultaneous localization and mapping (SLAM), which is a computational method of constructing or updating a map of an unknown environment. SLAM approximate solution methods include the pose graph, particle filter and extended Kalman filter methods. The SLAM GMapping approach is the preferred approach, but any suitable SLAM approach can be used. A discussion of SLAM can be found in Frese, U., Wagner, R., Röfer, T., "A SLAM overview from a user's perspective," Künstliche Intelligenz 24(3), 191-198 (2010), which is incorporated herein by reference.

Robot 18 utilizes its laser-radar 22 to create/update map 10a of warehouse 10 as robot 18 travels throughout the space identifying open space 112, walls 114, objects 116, and other static obstacles such as shelves 12a in the space, based on the reflections it receives as the laser-radar scans the environment.

Figure 4:
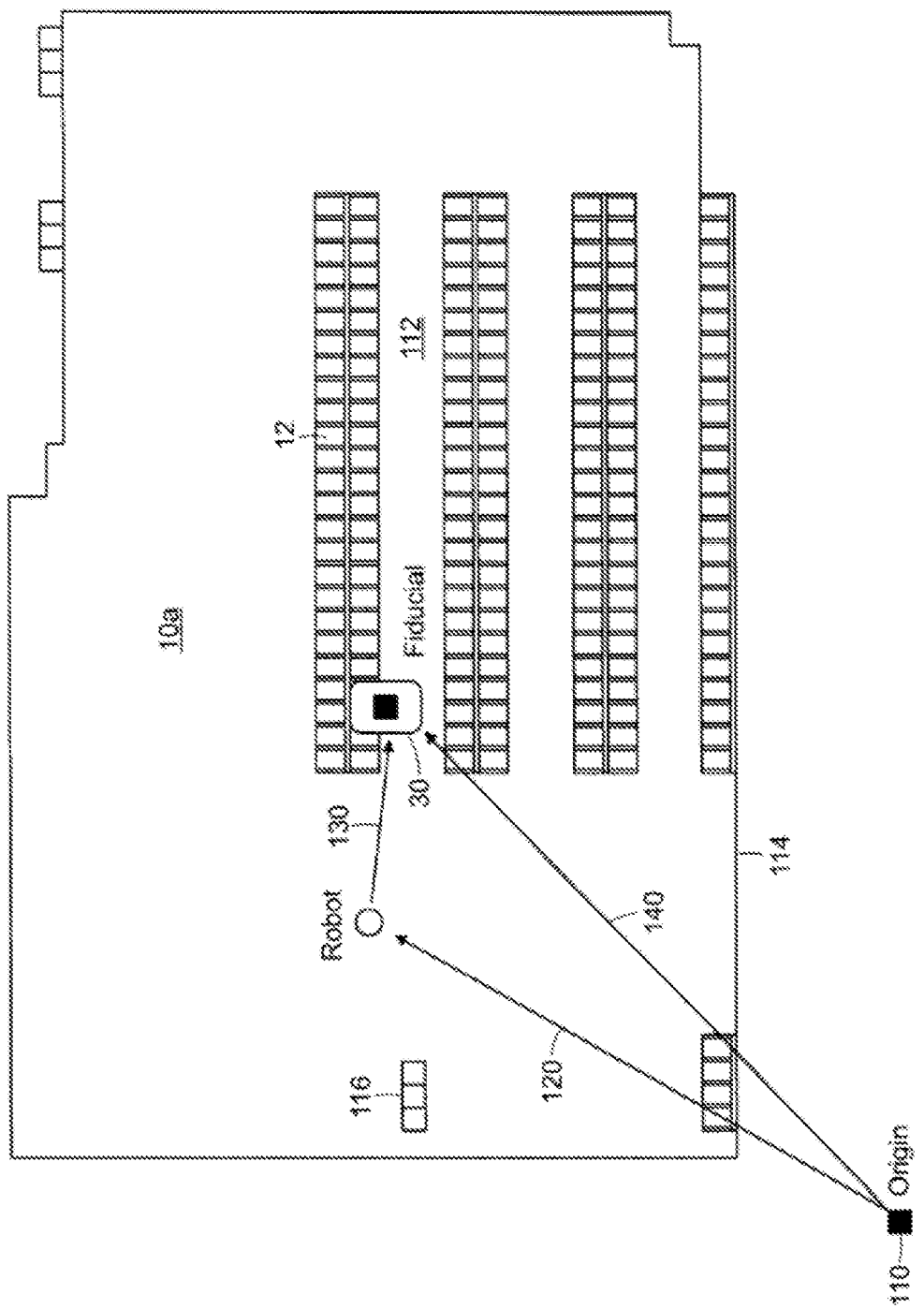
FIG. 4 is a partial map of the warehouse of FIG. 1 created using laser radar on the robot.

While constructing the map 10a or thereafter, one or more robots 18 navigates through warehouse 10 using cameras 24a and 24b to scan the environment to locate fiducial markers (two-dimensional bar codes) dispersed throughout the warehouse on shelves proximate bins, such as 32 and 34, FIG. 3, in which items are stored. Robots 18 use a known reference point or origin for reference, such as origin 110. When a fiducial marker, such as fiducial marker 30, FIGS. 3 and 4, is located by robot 18 using its cameras 24a and 24b, the location in the warehouse relative to origin 110 is determined. By using two cameras, one on either side of robot base, as shown in FIG. 2A, the robot 18 can have a relatively wide field of view extending out from both sides of the robot. This enables the robot to see, for example, fiducial markers on both sides of it as it travels up and down aisles of shelving.

By the use of wheel encoders (not shown) and heading sensors (not shown), vector 120, and the robot's position in the warehouse 10 can be determined. Using the captured image of a fiducial marker/two-dimensional barcode and its known size, robot 18 can determine the orientation with respect to and distance from the robot of the fiducial marker/two-dimensional barcode, vector 130. With vectors 120 and 130 known, vector 140, between origin 110 and fiducial marker 30, can be determined. From vector 140 and the determined orientation of the fiducial marker/two-dimensional barcode relative to robot 18, the pose (position and orientation) defined by x,y,z coordinates relative to origin 110 and by a quaternion (x, y, z, ω) for fiducial marker 30 can be determined. A discussion of using quaternions to represent and effect orientations is found in Berthold K. P. Horn, "Closed-form solution of absolute orientation using unit quaternions," Journal of the Optical Society of America, 4(4), April 1987, pp. 629-642, which is incorporated by reference herein. One skilled in the art would recognize that other coordinate systems and techniques for determination of fiducial marker position and orientation may be used, and that pose may determine an absolute or relative position and/or orientation from an arbitrary origin.

Figure 5:
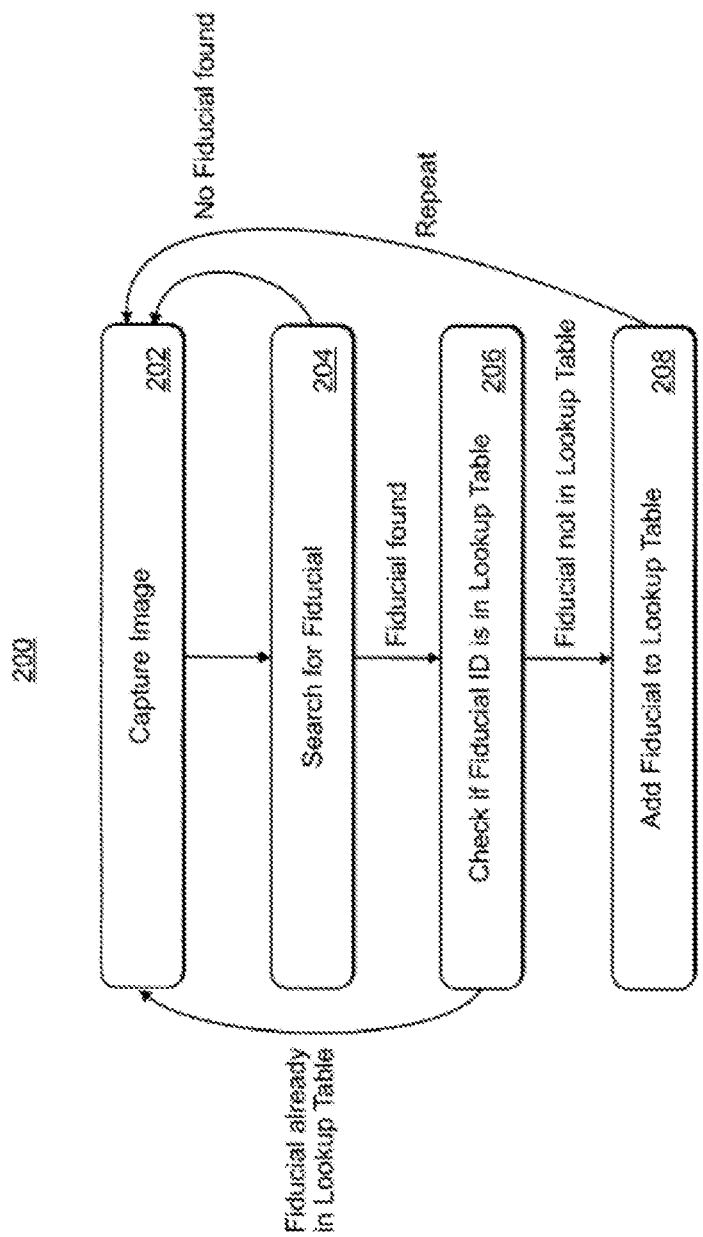
FIG. 5 is a flowchart depicting the process for locating fiducial markers dispersed throughout the warehouse and storing fiducial marker poses.

Flowchart 200, FIG. 5, describing the fiducial marker location process is described. This is performed in an initial mapping mode and as robot 18 encounters new fiducial markers in the warehouse while performing picking, placing and/or other tasks. In step 202, robot 18 using cameras 24a and 24b captures an image and in step 204 searches for fiducial markers within the captured images. In step 206, if a fiducial marker is found in the image (step 204) it is determined if the fiducial marker is already stored in fiducial table 300, FIG. 6, which is located in a memory of robot 18. If the fiducial information is stored in memory already, the flowchart returns to step 202 to capture another image. If it is not in memory, the pose is determined according to the process described above and in step 208, it is added to fiducial-to-pose lookup table 300.

In look-up table 300, which may be stored in the memory of each robot, there are included for each fiducial marker a fiducial identification, 1, 2, 3, etc., and a pose for the fiducial marker/bar code associated with each fiducial identification. The pose consists of the x,y,z coordinates in the warehouse relative to origin 110, along with the orientation or the quaternion (x,y,z,ω).

In another look-up Table 400, FIG. 7, which may also be stored in the memory of each robot, is a listing of bin locations (e.g. 402*a-f*) within warehouse 10, which are correlated to particular fiducial ID's 404, e.g. number "11". The bin locations, in this example, consist of seven alpha-numeric characters. The first six characters (e.g. L01001) pertain to the shelf location within the warehouse and the last character (e.g. A-F) identifies the particular bin at the shelf location. In this example, there are six different bin locations associated with fiducial ID "11". There may be one or more bins associated with each fiducial ID/marker. Charging stations located in charging area 19, FIG. 1, may also be stored in table 400 and correlated to fiducial IDs. From the fiducial IDs, the pose of the charging station may be found in table 300, FIG. 6.

The alpha-numeric bin locations are understandable to humans, e.g. operator 50, FIG. 3, as corresponding to a physical location in the warehouse 10 where items are stored. However, they do not have meaning to robot 18. By mapping the locations to fiducial robot 18 can determine the pose of the fiducial ID using the information in table 300, FIG. 6, and then navigate to the pose as described herein.

Figure 8:
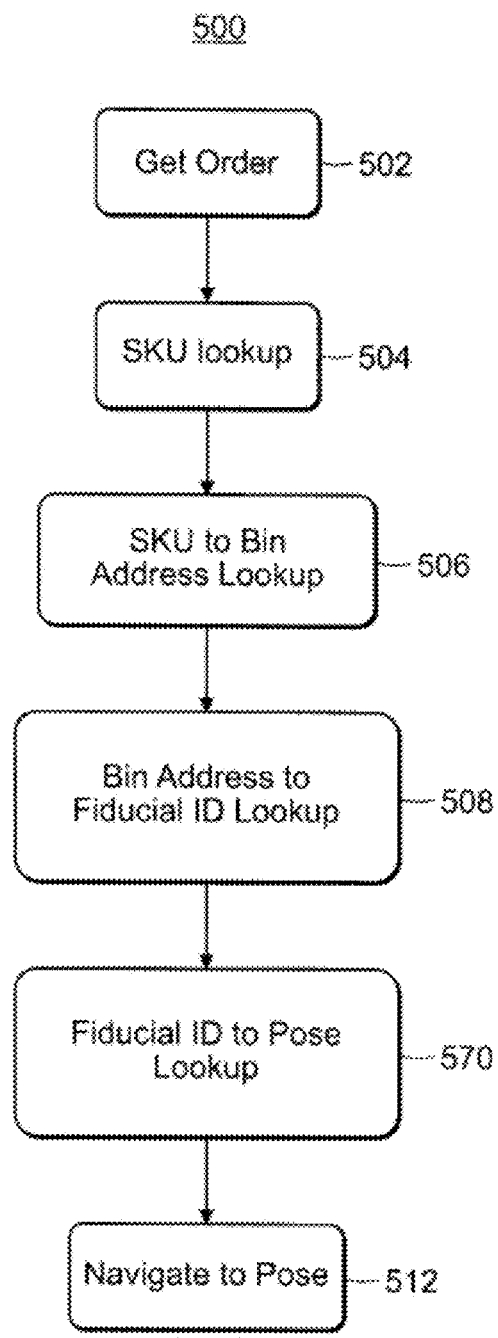
FIG. 8 is a flowchart depicting product SKU to pose mapping process.

The order fulfillment process according to this invention is depicted in flowchart 500, FIG. 8. In step 502, warehouse management system 15, FIG. 1, obtains an order, which may consist of one or more items to be retrieved. In step 504, the SKU number(s) of the items is/are determined by the warehouse management system 15, and from the SKU number(s), the bin location(s) is/are determined in step 506. A list of bin locations for the order is then transmitted to robot 18. In step 508, robot 18 correlates the bin locations to fiducial ID's and from the fiducial ID's, the pose of each fiducial ID is obtained in step 510. In step 512 the robot 18 navigates to the pose as shown in FIG. 3, where an operator can pick the item to be retrieved from the appropriate bin and place it on the robot.

Item specific information, such as SKU number and bin location, obtained by the warehouse management system 15, can be transmitted to tablet 48 on robot 18 so that the operator 50 can be informed of the particular items to be retrieved when the robot arrives at each fiducial marker location.

With the SLAM map and the pose of the fiducial ID's known, robot 18 can readily navigate to any one of the fiducial s using various robot navigation techniques. The preferred approach involves setting an initial route to the fiducial marker pose given the knowledge of the open space 112 in the warehouse 10 and the walls 114, shelves (such as shelf 12) and other obstacles 116. As the robot begins to traverse the warehouse using its laser-radar 22, it determines if there are any obstacles in its path, either fixed or dynamic, such as other robots 18 and/or operators 50, and iteratively updates its path to the pose of the fiducial marker. The robot re-plans its route about once every 50 milliseconds, constantly searching for the most efficient and effective path while avoiding obstacles.

Generally, localization of the robot within warehouse 10*a* is achieved by many-to-many multiresolution scan matching (M3RSM) operating on the SLAM map. Compared to brute force methods, M3RSM dramatically reduces the computational time for a robot to perform SLAM loop closure and scan matching, two critical steps in determining robot pose and position. Robot localization is further improved by minimizing the M3RSM search space according to methods disclosed herein.

With the product SKU/fiducial ID to fiducial pose mapping technique combined with the SLAM navigation technique both described herein, robots 18 are able to very efficiently and effectively navigate the warehouse space without having to use more complex navigation approaches typically used which involve grid lines and intermediate fiducial markers to determine location within the warehouse.

Generally, navigation in the presence of other robots and moving obstacles in the warehouse is achieved by collision avoidance methods including the dynamic window approach (DWA) and optimal reciprocal collision avoidance (ORCA). Navigation of a robot typically proceeds as a series of incremental movements along trajectories computed at the approximately 50 ms update intervals. DWA computes among feasible robot motion trajectories of the incremental movement that avoids collisions with stationary obstacles and favors the desired path to the target fiducial marker. A discussion of DWA is provided in D. Fox, W. Burgard, and S. Thrun, "The Dynamic Window Approach to Collision Avoidance," in Robotics & Automation Magazine, IEEE, vol. 4, no. 1. (March 1997), pp. 23-33, which is incorporated by reference herein.

ORCA optimally avoids collisions with other moving robots without requiring communication with the other robot(s). A discussion of ORCA is described in Jur van den Berg, Stephen J. Guy, Ming Lin, and Dinesh Manocha, "Reciprocal n-body collision avoidance", in Robotics Research: The 14th International Symposium ISRR, Cedric Pradalier, Roland Siegwart, and Gerhard Hirzinger (eds.), Springer Tracts in Advanced Robotics, Vol. 70, Springer-Verlag, May 2011, pp. 3-19, which is incorporated by reference herein.

Collision avoidance may be further improved by techniques described in related U.S. patent application Ser. No. 15/712,256, incorporated by reference herein.

Robot System

Figure 9:
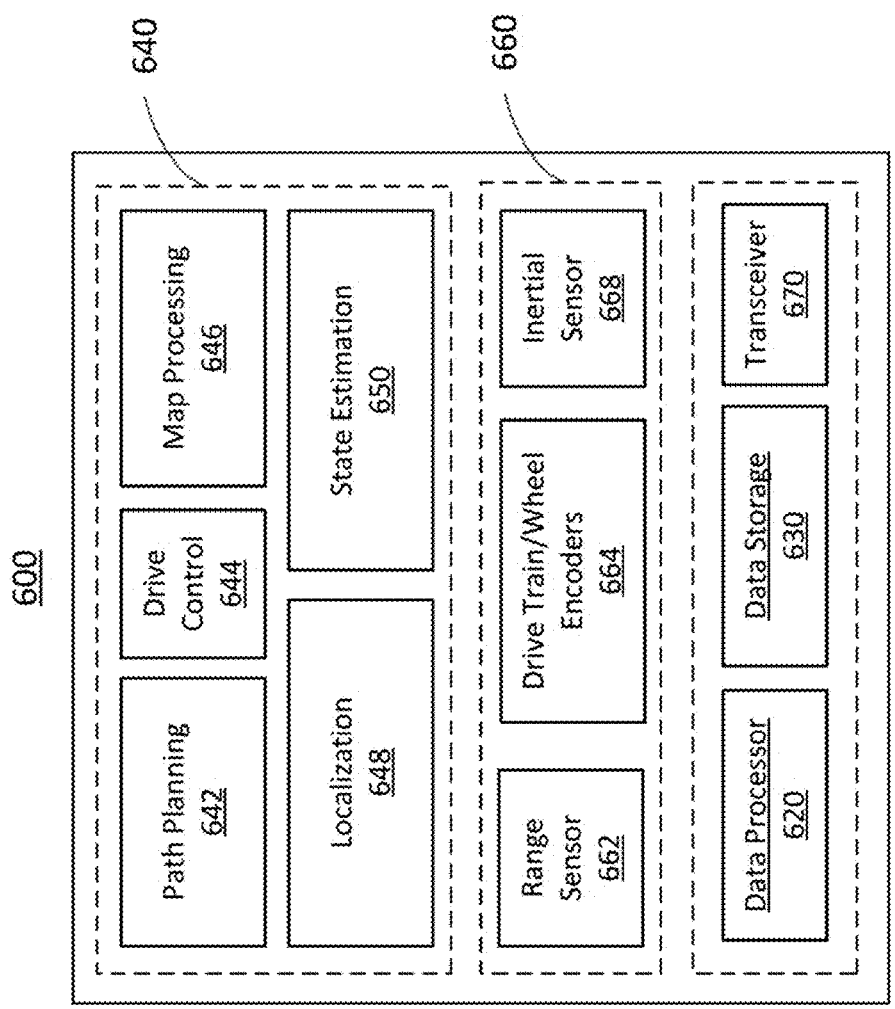
FIG. 9 shows one embodiment of a robot system for use with the methods and systems of present invention.

FIG. 9 illustrates a system view of one embodiment of robot 18 for use in the above described order fulfillment warehouse application. Robot system 600 comprises data processor 620, data storage 630, processing modules 640, and sensor support modules 660. Processing modules 640 may include path planning module 642, drive control module 644, map processing module 646, localization module 648, and state estimation module 650. Sensor support modules 660 may include range sensor module 662, drive train/wheel encoder module 664, and inertial sensor module 668.

Data processor 620, processing modules 642 and sensor support modules 660 are capable of communicating with any of the components, devices or modules herein shown or described for robot system 600. A transceiver module 670 may be included to transmit and receive data. Transceiver module 670 may transmit and receive data and information to and from a supervisor system or to and from one or other robots. Transmitting and receiving data may include map data, path data, search data, sensor data, location and orientation data, velocity data, and processing module instructions or code, robot parameter and environment settings, and other data necessary to the operation of robot system 600.

In some embodiments, range sensor module 662 may comprise one or more of a scanning laser, radar, laser range finder, range finder, ultrasonic obstacle detector, a stereo vision system, a monocular vision system, a camera, and an imaging unit. Range sensor module 662 may scan an environment around the robot to determine a location of one or more obstacles with respect to the robot. In a preferred embodiment, drive train/wheel encoders 664 comprises one or more sensors for encoding wheel position and an actuator for controlling the position of one or more wheels (e.g., ground engaging wheels). Robot system 600 may also include a ground speed sensor comprising a speedometer or radar-based sensor or a rotational velocity sensor. The rotational velocity sensor may comprise the combination of an accelerometer and an integrator. The rotational velocity sensor may provide an observed rotational velocity for the data processor 620, or any module thereof.

In some embodiments, sensor support modules 660 may provide translational data, position data, rotation data, level data, inertial data, and heading data, including historical data of instantaneous measures of velocity, translation, position, rotation, level, heading, and inertial data over time. The translational or rotational velocity may be detected with reference to one or more fixed reference points or stationary objects in the robot environment. Translational velocity may be expressed as an absolute speed in a direction or as a first derivative of robot position versus time. Rotational velocity may be expressed as a speed in angular units or as the first derivative of the angular position versus time. Translational and rotational velocity may be expressed with respect to an origin 0,0 (e.g. FIG. 1, 110) and bearing of 0-degrees relative to an absolute or relative coordinate system. Processing modules 640 may use the observed translational velocity (or position versus time measurements) combined with detected rotational velocity to estimate observed rotational velocity of the robot.

In some embodiments, robot system 600 may include a GPS receiver, a GPS receiver with differential correction, or another receiver for determining the location of a robot with respect to satellite or terrestrial beacons that transmit wireless signals. Preferably, in indoor applications such as the warehouse application described above or where satellite reception is unreliable, robot system 600 uses non-GPS sensors as above and techniques described herein to improve localization where no absolute position information is reliably provided by a global or local sensor or system.

In other embodiments, modules not shown in FIG. 9 may comprise a steering system, braking system, and propulsion system. The braking system may comprises a hydraulic braking system, an electro-hydraulic braking system, an electro-mechanical braking system, an electromechanical actuator, an electrical braking system, a brake-by-wire braking system, or another braking system in communication with drive control 644. The propulsion system may comprise an electric motor, a drive motor, an alternating current motor, an induction motor, a permanent magnet motor, a direct current motor, or another suitable motor for propelling a robot. The propulsion system may comprise a motor controller (e.g., an inverter, chopper, wave generator, a multiphase controller, variable frequency oscillator, variable current supply, or variable voltage supply) for controlling at least one of the velocity, torque, and direction of rotation of the motor shaft of the electric motor. Preferably, drive control 644 and propulsion system (not shown) is a differential drive (DD) control and propulsion system. In a DD control system robot control is non-holonomic (NH), characterized by constraints on the achievable incremental path given a desired translational and angular velocity. Drive control 644 in communication with propulsion system may actuate incremental movement of the robot by converting one or more instantaneous velocities determined by path planning module 642 or data processor 620.

One skilled in the art would recognize other systems and techniques for robot processing, data storage, sensing, control and propulsion may be employed without loss of applicability of the present invention described herein.

Maps

Figure 10:
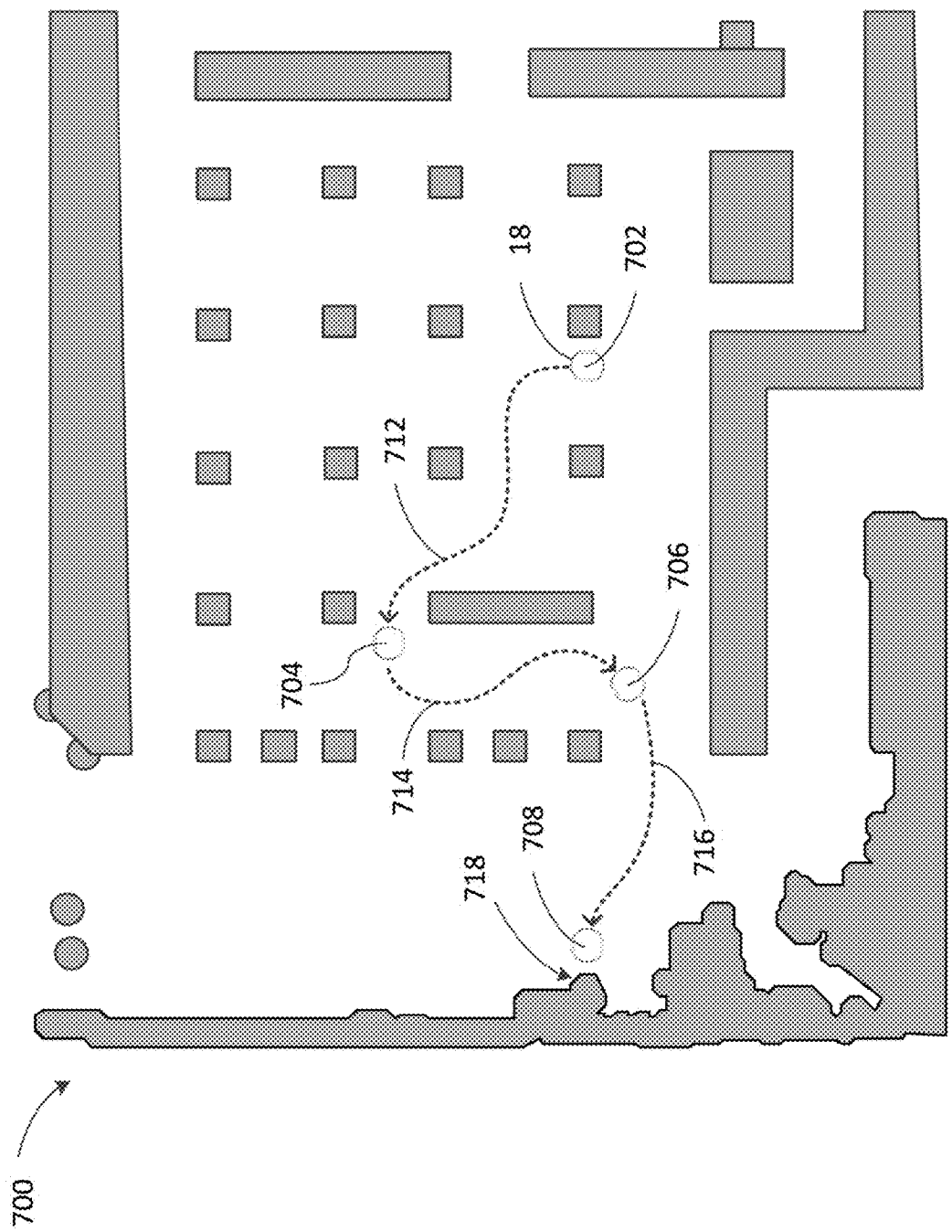
FIG. 10 depicts generalized navigation of a robot from a current location to a target location through an environment represented by a spatial map.

Navigation by an autonomous or semi-autonomous robot requires some form of spatial model of the robot's environment. Spatial models may be represented by bitmaps, object maps, landmark maps, and other forms of two- and three-dimensional digital representations. A spatial model of a warehouse facility, as shown in FIG. 10 for example, may represent a warehouse and obstacles within such as walls, ceilings, roof supports, windows and doors, shelving and storage bins. Obstacles may be stationary or moving, for example, such as other robots or machinery operating within the warehouse, or relatively fixed but changing, such as temporary partitions, pallets, shelves and bins as warehouse items are stocked, picked and replenished.

Spatial models in a warehouse facility may also represent target locations such as a shelf or bin marked with a fiducial to which a robot may be directed to pick product or to perform some other task, or to a temporary holding location or to the location of a charging station. For example, FIG. 10 depicts the navigation of robot 18 from a starting location 702 to intermediate locations 704,706 to destination or target location 708 along its path 712,714,716. Here the spatial model captures features of the environment through which the robot must navigate, including features of a structure at a destination 718 which may be a shelf or bin or a robot charger station.

Figure 11:
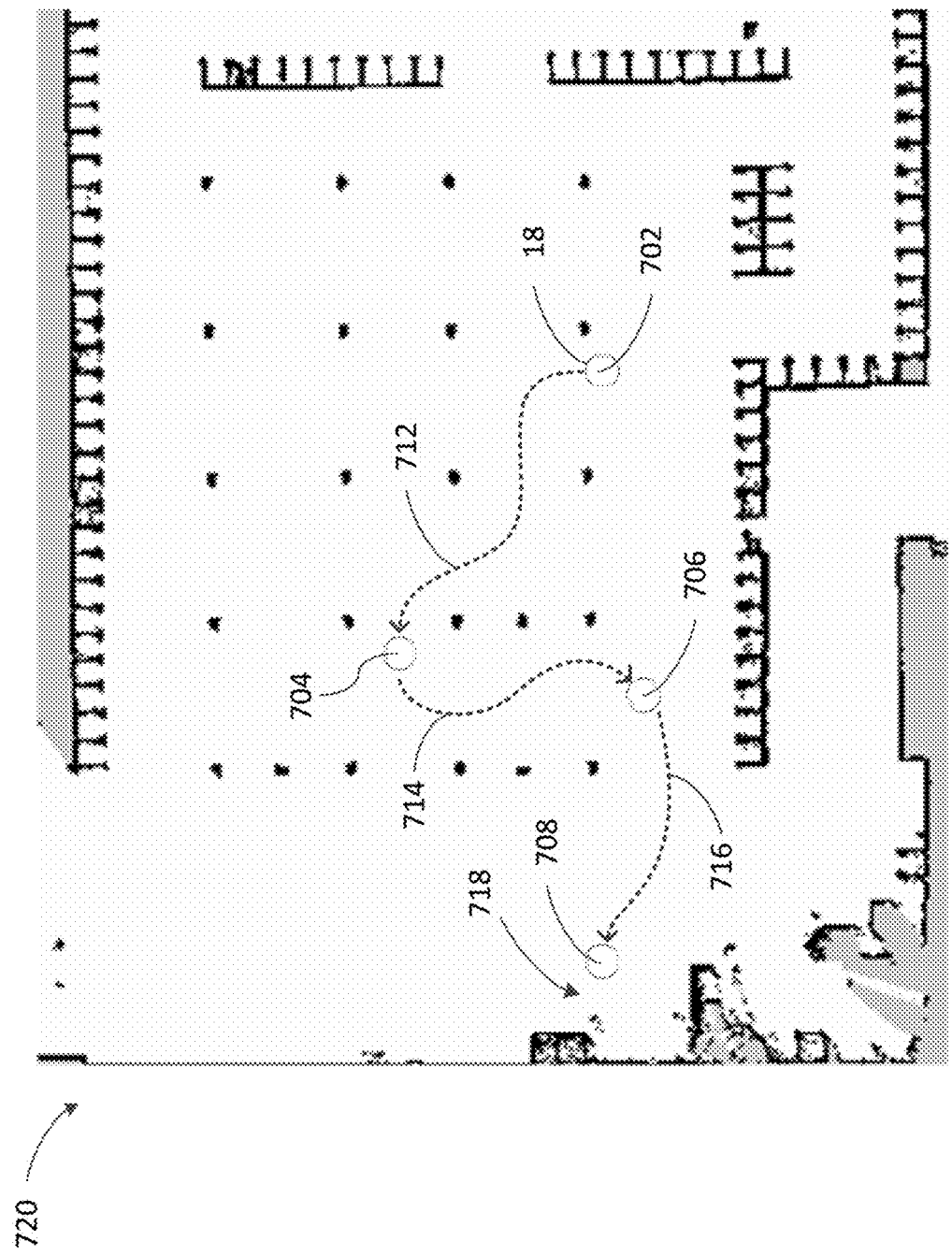
FIG. 11 depicts navigation of robot in relation to a SLAM map of the environment of FIG. 10, according to one aspect of the invention.

The spatial model most commonly used for robot navigation is a bitmap of an area or facility. FIG. 11, for example, depicts a portion of a two-dimensional map for the areas shown in the spatial model of FIG. 10. Map 720 may be represented by bitmaps having pixel values in a binary range 0,1, representing black or white, or by a range of pixel values, for example 0-255 representing a gray-scale range of black (0) to white (255) or by color ranges, the ranges of which may depict uncertainties in whether a feature is present at the location represented by the pixel values. As shown in FIG. 11, for example, pixels in black (0) represent obstacles, white (255) pixels represent free space, and areas of solid gray (some value between 0 and 255, typically 128) represent unknown areas.

The scale and granularity of map 720 shown in the FIG. 11 may be any such scale and dimensions as is suitable for the range and detail of the environment. For example, in the some embodiments of the present invention, each pixel in the map may represent 5 square centimeters ($cm^2$). In other embodiments each pixel may represent a range from 1 $cm^2$ to 5 $cm^2$. However, the spatial resolution of a map for use with the present invention may be larger or smaller without loss of generality or benefit to the application of its methods.

As depicted in FIG. 11, map 720 may be used by the robot to determine its pose within the environment and to plan and control its movements along path 712,714,716, while avoiding obstacles. Such maps may be "local maps", representing spatial features in the immediate vicinity of the robot or target location, or "global maps", representing features of an area or facility encompassing the operating range of one or more robots. Maps may be provided to a robot from an external supervisory system or a robot may construct its map using onboard range finding and location sensors. One or more robots may cooperatively map a shared environment, the resulting map further enhanced as the robots navigate, collect, and share information about the environment.

In some embodiments the supervisory system may comprise a central server performing supervision of a plurality of robots in a manufacturing warehouse or other facility, or the supervisory system may comprise a distributed supervisory system consisting of one or more servers operating within or without the facility either fully remotely or partially without loss of generality in the application of the methods and systems herein described. The supervisory system may include a server or servers having at least a computer processor and a memory for executing a supervisory system and may further include one or more transceivers for communicating information to one or more robots operating in the warehouse or other facility. Supervisory systems may be hosted on computer servers or may be hosted in the cloud and communicating with the local robots via a local transceiver configured to receive and transmit messages to and from the robots and the supervisory system over wired and/or wireless communications media including over the Internet.

One skilled in the art would recognize that robotic mapping for the purposes of the present invention could be performed using methods known in the art without loss of generality. Further discussion of methods for robotic mapping can be found in Sebastian Thrun, "Robotic Mapping: A Survey", Carnegie-Mellon University, CMU-CS-02-111, February, 2002, which is incorporated herein by reference.

Scans

A robot outfitted with sensors, as described above, can use its sensors for localization as well as contribute to the building and maintenance of the map of its environment. Sensors used for map building and localization may include light detection and ranging ("LIDAR" or "laser scanning" or "laser-radar") sensors. Laser-radar scanners measure the range and distance to objects in a horizontal plane with a series of discrete, angular sweeps of the robot's local environment. A range finding sensor acquires a set of measurements, a "scan" taken at discrete angular increments of preferably one-quarter (0.25) degree increments over a 180-degree arc or a greater or lessor degree arc, or a full 360-degree arc about the robot. A laser-radar scan, for example, may be a set of measurements representing the return time and strength of a laser signal, each measurement at a discrete angular increment indicating a potential obstacle at a distance from the robot's current position.

Figure 12B:
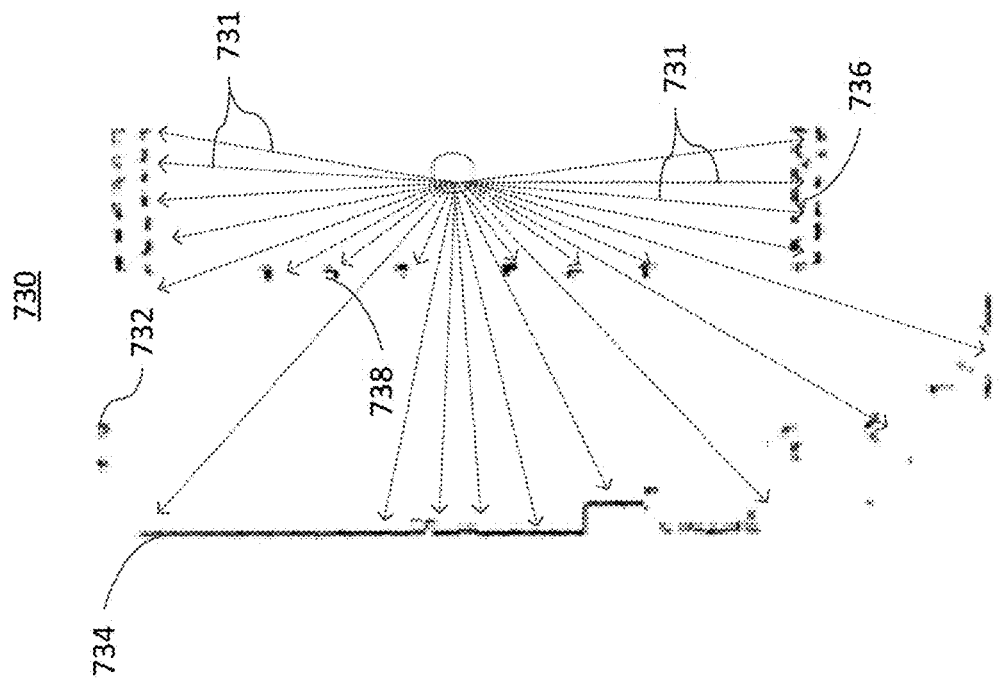
FIGS. 12A and 12B depict acquiring a range finding scan by a robot at a location within the spatial environment.
Figure 12A:
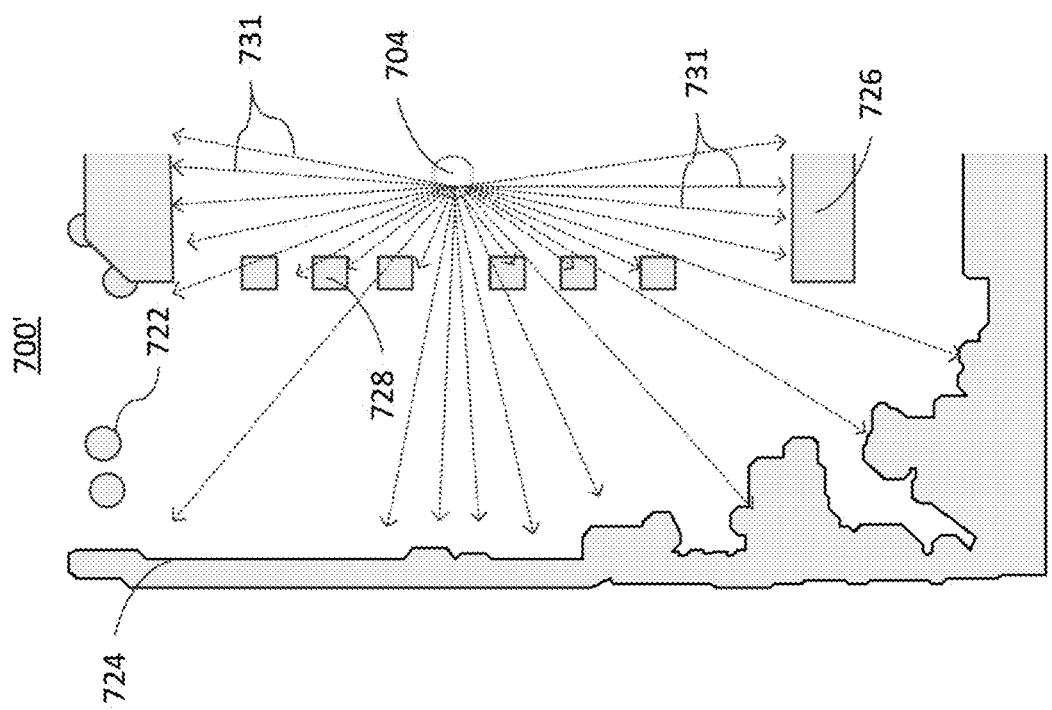

For illustration, as shown in FIGS. 12A and 12B, a laser-radar scan taken at location 704 can be represented graphically as a two-dimensional bitmap 730. Scan 730 as shown depicts an approximately 180-degree horizontal arc facing in the direction of travel of the robot at intermediate pose 704. Individual laser-radar measurements 731, depicted by directional broken lines, detect obstacles in the robot's environment 700' at structures 722, 724, 726, and 728. These are represented by pixels at 732, 734, 736, and 738 in scan 730. In some embodiments, scans of straight walls 724 may be "filled in" in scan 730 where a connected geographic structure 734 may be known from other data or discernable by alignment of point cloud pixels.

Other forms of range finding sensors include sonar, radar, and tactile sensor without departing from the scope of the invention. Examples of commercially available range finding and location and orientation sensors suitable for use with the present invention include, but are not limited to, the Hokuyo UST-10LX, the SICK LMS 100, and the Velodyne VLP-16. A robot may have one or more range or location sensors of a particular type, or it may have sensors of different types, the combination of sensor types producing measurements that collectively map its environment. Further discussion of methods of robotic mapping by LIDAR and other scanners can be found in Edwin B. Olson, "Robust and Efficient Robotic Mapping", PhD Dissertation, Carnegie-Mellon University, 2008, which is incorporated herein by reference.

Scan Matching

"Scan matching" is the process of comparing range finding scans by different robots or scans of a single robot taken at different times or to a map of an environment such as a SLAM map. In the scan-to-scan matching process, a first laser-radar scan taken by a robot at one time may be compared to a second, earlier scan to determine if the robot has returned to the same location in the map. Likewise, matching the scan to a second robot's scan can determine if the two robots have navigated to a common location in the map. Scan matching to a map can be used to determine the pose of the robot in the mapped environment. As illustrated in FIG. 13A, scan 730' is depicted as translated and rotated relative to map portion 720'. For a robot at an unknown pose $(x, y, \theta)$, matching the robot's laser-radar scan to map 720' finds the rigid body transformation T with translation $\Delta x, \Delta y$ and rotation $\Delta \theta$ that causes scan 730' to correlate most strongly to map 720'. Thus, the correct pose of the robot $(x+\Delta x, y+\Delta y, \theta+\Delta \theta)$ relative to a portion of map 720 as depicted by FIG. 13B can be determined.

It is unlikely that a laser-radar scan matches exactly with the map at any arbitrary location and orientation. Uncertainties in sensor measurements, the demands of pose accuracy, and limited computational cycle times require robust and efficient algorithms to statistically determine the best scan match between a robot's sensed environment and its actual pose. Statistical methods, however, are susceptible to producing inaccurate poses and can be computationally expensive. Various methods and algorithms have been developed to address these complexities. A survey of scan matching techniques and a two-resolution method for ensuring accuracy while reducing computational complexity in scan matching for localization can be found in Edwin B. Olson, "Real-Time Correlative Scan Matching", in Proceedings of the 2009 IEEE international Conference on Robotics and Automation (ICRA'09), IEEE Press, Piscataway, N.J., USA, 2009, pp. 1233-1239, which is incorporated herein by reference.

M3RSM

As previously mentioned, another such technique for localizing using scan matching is many-to-many multiresolution scan matching or "M3RSM". M3RSM extends the two-resolution correlative scan matching approach to multiple resolutions, using a pyramid of maps, each constructed by decimation for computational efficiency. A discussion of M3RSM can be found in Edwin Olson, "M3RSM: Many-to-many multi-resolution scan matching", Proceedings of the IEEE International Conference on Robotics and Automation (ICRA), June 2015, which is incorporated herein by reference.

M3RSM dramatically reduces the processing time to perform scan matching against a SLAM map by eliminating candidate poses from consideration at lower resolutions of the map. However, M3RSM unnecessarily performs scan matching for poses that would place the robot within obstacles. Further improvement of scan matching using a modified M3RSM approach results in even more savings in computational time without sacrificing optimal pose estimation.

The improvement to M3RSM is achieved by introducing multi-resolution "exclusion maps" in an "exclusion pyramid" structure for use within the M3RSM scan matching search process. Exclusion maps as used herein define "exclusion zones" or locations in the map of the environment that a robot cannot physically occupy. Exclusion pyramids as used in the modified M3RSM described herein preserves the provably optimal pose estimates provided by standard M3RSM. Exclusion maps and exclusion pyramids are thus described for use during localization of a laser-radar scan at an unknown pose using M3RSM to find the pose for navigation of a robot along its goal path in the context of the above order fulfillment warehouse application.

Localization

Figure 14:
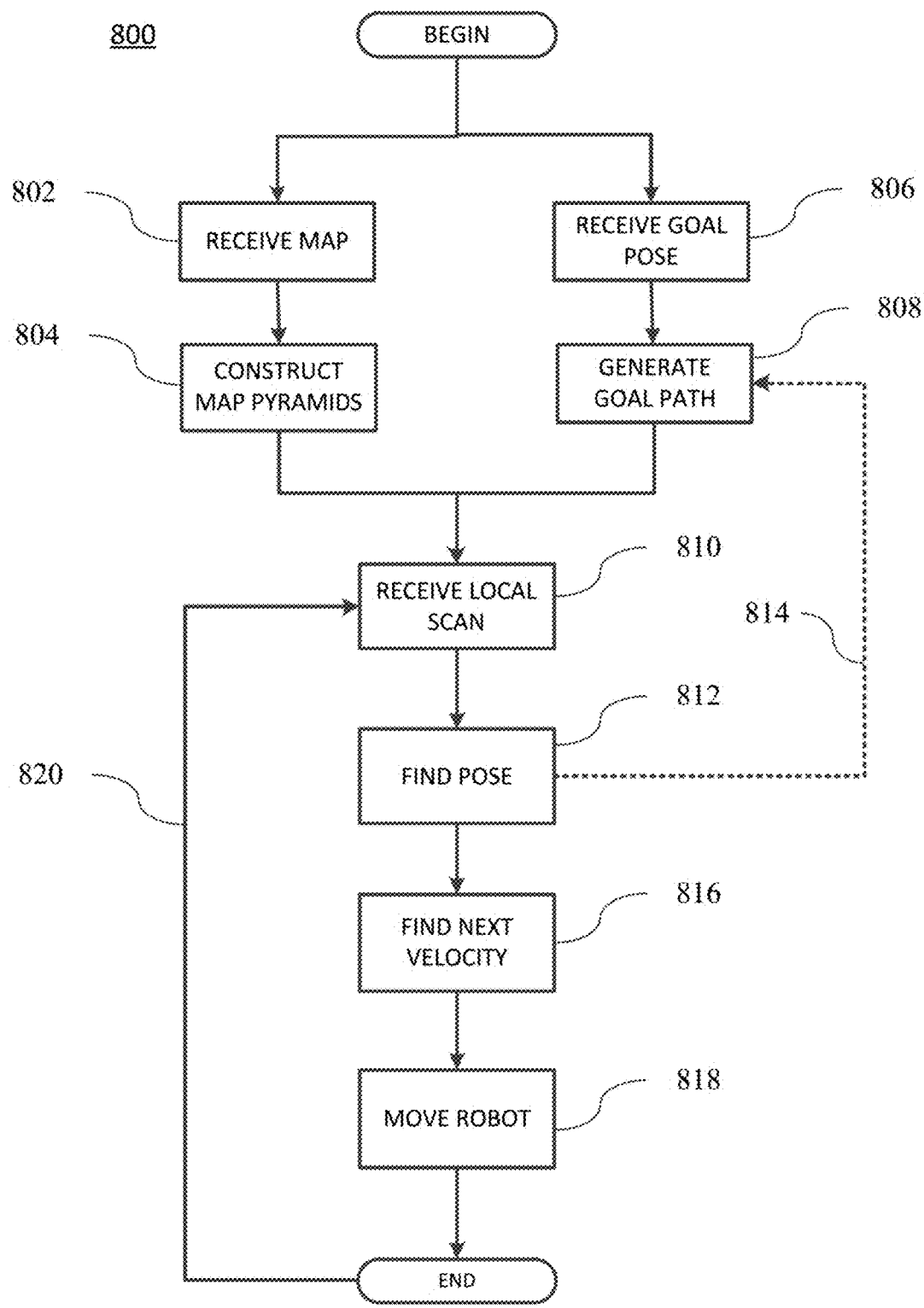
FIG. 14 illustrates the process performed by the robot to move the robot along a global path, according to one aspect of the invention.

FIG. 14 illustrates an embodiment of the present invention as a method for finding the pose of the robot for goal path planning and for moving the robot along the goal path to its target location or "goal pose".

Beginning at step 802, robot system 600 receives a SLAM map via transceiver module 670, which may be stored in data storage 630. The map may be subsequently retrieved from data storage 630, by data processor 620 or map processing module 646. Upon receipt of the map, at step 804 map processing module 646 constructs map pyramids according to the modified M3RSM techniques described in greater detail below. In constructing map pyramids, a multiresolution "matching pyramid" is constructed according to the principles and methods of M3RSM. Additionally, a multiresolution exclusion pyramid not present in standard M3RSM is constructed in parallel with the matching pyramid thus extending M3RSM according to inventive aspects of the present invention.

Continuing with the process 800, at step 806 robot system 600 receives a goal pose and generates, using path planning module 646, the goal path which may then be stored for later processing. The goal path may be generated based on a pose estimate for the robot, or, preferably, generating the goal path is based on the pose of the robot determined after the first iteration of the "Find Pose" step 812, as further described below. Path planning module 642 may generate the goal path from the current pose to the goal pose by a variety of techniques known to practitioners in the art including the A* and D* pathfinding algorithms. Alternatively, the robot may receive a goal path via transceiver module 670 or may retrieve a goal path from data storage 630. Having received the map and generated the map pyramids and goal path, robot system 600 then proceeds to execute process 800 to move the robot incrementally along the goal path as follows.

At step 810, robot system 600 receives a local scan (for example, 730 of FIG. 13A) of its environment (for example, 720 of FIG. 12A). As above, the scan may include a laser-radar scan or other range finding sensor scan. The scan may consist of a laser-radar "point cloud" representing points in the field of view of the robot at which obstacles are detected by the laser-radar. The point cloud may represent points of the laser-radar scan at a position and orientation relative to the robot, each point in the point cloud taken at a discrete angular increment and indicating a potential obstacle at a distance from the robot's current position.

Figure 15A:
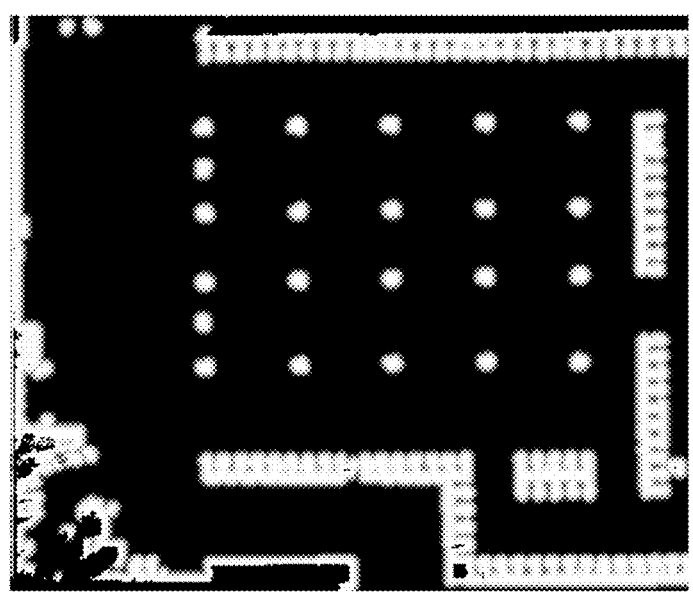
FIGS. 15A and 15B depict conversion of a SLAM map for use in constructing the matching pyramid and exclusion pyramid.

At step 812, the pose of the robot is determined. Finding the pose from the local scan using the map with M3RSM is further described below with reference to FIG. 15. At step 814, the process may return to generate or update the goal path based on a first or subsequent find pose result.

Having found the pose, at step 816 the robot calculates an instantaneous next velocity for moving the robot along the goal path. Preferably, instantaneous velocity along the goal path in the presence of other robots and obstacles is achieved by methods including, but not limited to, the dynamic window approach (DWA) and optimal reciprocal collision avoidance (ORCA). In a preferred embodiment, DWA computes among feasible robot motion trajectories an incremental movement that avoids collisions with obstacles and favors the desired goal path to the target location.

Upon determining a next velocity and robot movement (step 818), robot system 600 may repeat (step 820), obtaining of a new local scan (step 810), finding pose (step 812) and next velocity (step 816) until the goal pose is reached by movement of the robot. Navigation thus proceeds as a series of incremental movements along incremental trajectories determined by the instantaneous velocity at each processing cycle.

Matching Pyramid

Returning to step 804 of FIG. 14, constructing the map pyramids for use with M3RSM proceeds from having received a SLAM map of the robot's local or global environment. As described above and depicted in FIG. 11, for illustration only, SLAM map 720 represents a portion of a warehouse containing free space and obstacles. Pixel values of map 720 in a binary range of 0,1 represent obstacles (0 or black) and free space (1 or white). Alternatively, map 720 may represent obstacles within the warehouse using pixel values in a range of 0-255, with values of zero (0) representing obstacles and 255 indicating free space. Gray pixels, if any, typically having value 128 represent unknown or unmapped or inaccessible areas.

Constructing the highest resolution matching map of the matching pyramid begins with inverting the SLAM map. Next, a quadratic decay convolution is performed on the inverted map. As depicted by map 900 of FIG. 15A, pixel values of zero (0) or black represent free space and values of 255 or white represent obstacles. One skilled in the art will understand that applying a quadratic decay convolution or "fuzzification" filter has the effect of slightly increasing the size of obstacles in map 900, and produces pixel values in a range of 0-255.

Figure 16A:
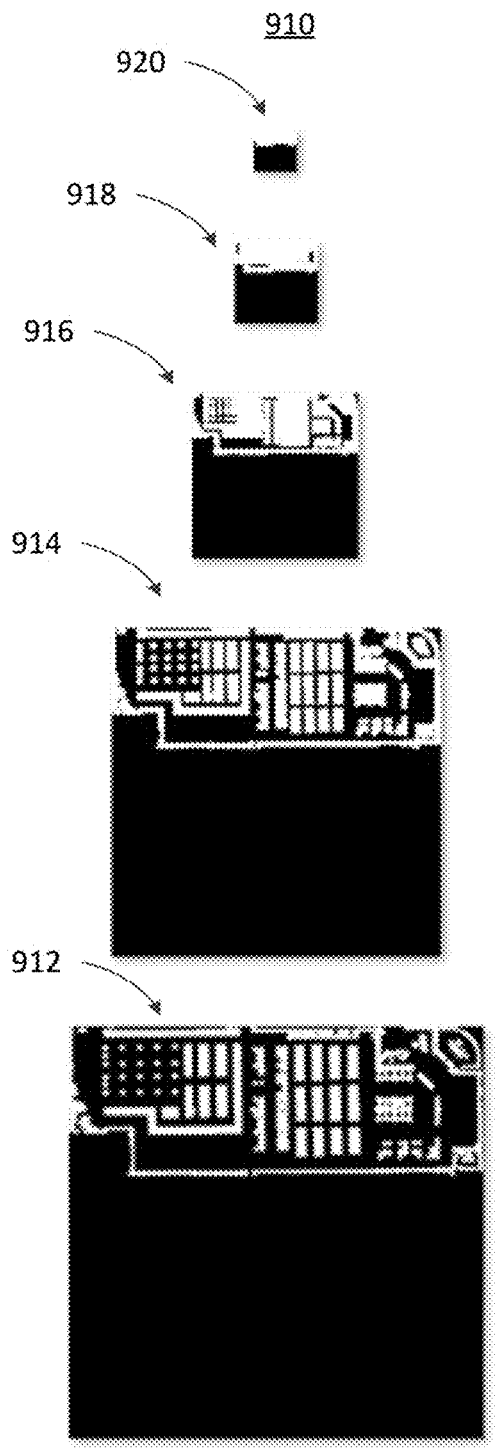
FIGS. 16A and 16B depict a matching pyramid (16A) and an exclusion pyramid (16B)

Continuing in step 804, construction of the map pyramids proceeds as follows. As illustrated in FIG. 16A, matching pyramid 910 is a set of maps at successively lower resolutions, beginning at highest resolution matching map 912 at the base of the pyramid, to the lowest resolution matching map at the top. Construction of the matching pyramid begins with map 912 (representing the full map of the warehouse) padded with zeroes (black) to form a square bitmap at the highest resolution map of matching pyramid 910. Highest resolution matching map 912 is a square map of N×N pixels for computational efficiencies but may be any dimension or value of N.

Construction of matching pyramid 910 continues by decimating map 912 into successively lower resolution matching maps (914, 916, 918, 920), with each lower resolution map derived by the decimation of the next highest resolution map. For example, lower resolution matching map 914 is derived from a decimation of highest resolution matching map 912; matching map at lower resolution 916 is derived by decimating matching map 914 and so on, until only a single pixel remains.

Figure 17C:
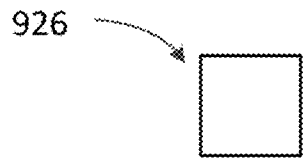
FIGS. 17A, 17B, and 17C depict decimation of a portion of a matching map from a higher resolution map to two lowest level resolutions of the matching pyramid.

Decimation of the highest resolution matching map 912 to construct the matching pyramid 910 will now be described in reference to FIGS. 17A-C. Generally, at each decimation of a higher resolution map into a lower resolution map, a window 940 of nine pixels (3×3 square) is passed over every second pixel, in every other row of the map. The value retained for the corresponding pixel at the next lowest resolution is the maximum pixel value in the nine-pixel window. The lowest resolution map in the matching pyramid is a single pixel. Thus, each decimation overestimates the likelihood of a scan match at the next lower resolution matching map. This ensures that scan matching at lower resolutions scores at least as well as scan matching at the next highest resolution, preserving M3RSM optimality of finding the correct pose.

Figure 17B:
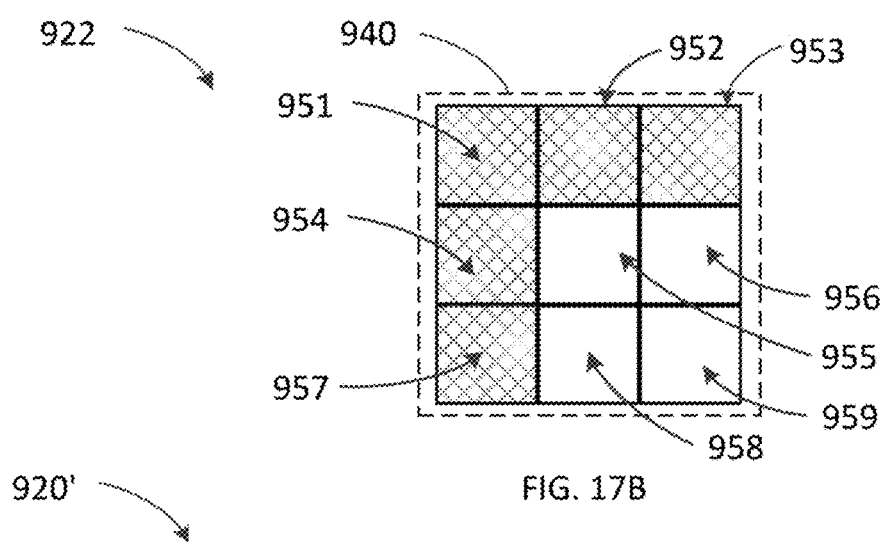
Figure 17A:
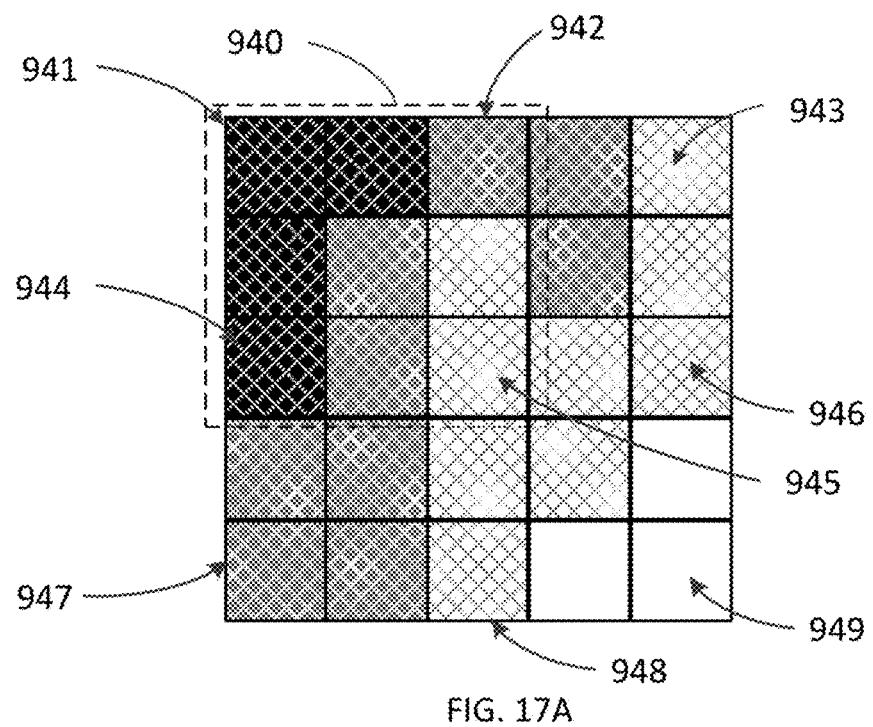

FIGS. 17A and 17B illustrate decimation of a portion 920' of map 920 of matching pyramid 910. For example, decimation of map 920' produces the lower resolution map 924. Map 924 may be a portion of a map at the next lower resolution. Recalling that black (0) in the highest resolution matching map is a minimum value and white (255) is a maximum value, nine-pixel window 940 positioned over top left pixel 941 produces the value of pixel 951 of FIG. 17B. The value of pixel 951 is the maximum value of pixels within window 940. Sliding window 940 two pixels to the right in map 920' produces pixel value 952. The windowing process continues until window 940 reaches the end of a row, where non-existent pixel values in a window area beyond the row are ignored.

Continuing the decimation in the second row of portion 920', moving window 940 two rows down locates pixel 944 in the top left of window 940. Taking the maximum value produces pixel value 954 in FIG. 17B, and so on to the end of the second row. In this manner, pixel values 951 to 959 of FIG. 17B correspond to the maximum values of pixels when window 940 is positioned with its top left corner over pixels 941 to 949, respectively. Thus, for example, center pixel 955 of FIG. 17B is white, the maximum value taken over window 940 with its top left corner over pixel 945 of FIG. 17A. Repeating the decimation and taking the maximum at each next lower resolution continues until only a single pixel 926 remains at the lowest resolution of matching pyramid 910.

Exclusion Pyramid

Continuing in step 804 of FIG. 14, construction of the exclusion pyramid proceeds as follows. As above for the matching pyramid construction, received map 720 represents areas of a warehouse containing free space and obstacles. The map 720 has pixel values in a binary range of 0,1 where zero (0) or black represents obstacles, and one (1) or white represents free space. Alternatively, map 720 may represent obstacles within the warehouse using pixel values in a range of 0,255 with values of zero (0) representing obstacles and 255 indicating free space. Gray pixels (typically with value 128) represent unknown areas. As with the construction of the highest resolution matching map, gray areas in map 720 are converted to black.

Figure 15B:
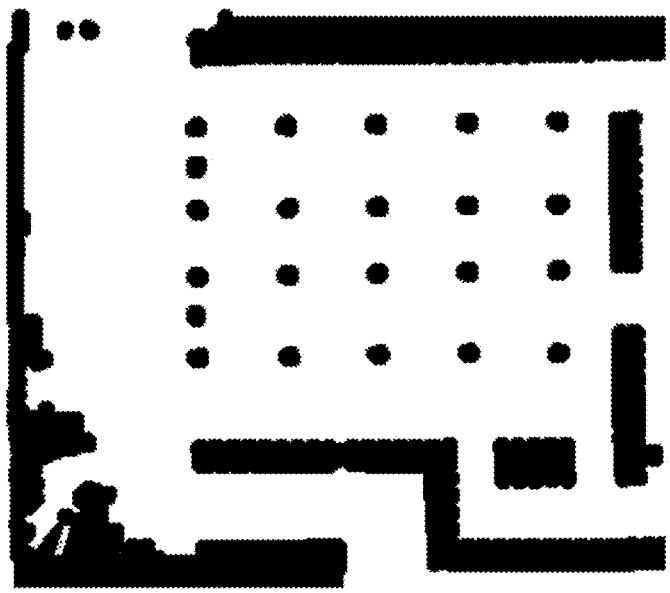

FIG. 15B depicts a portion of a highest resolution exclusion map 910 where pixel values of zero (0) or black represent obstacles and values of one (1) or white represent free space. Unlike the matching pyramid, map 720 is not inverted and no fuzzification is performed to construct map 910. Rather, obstacles (in black) are enlarged or "inflated" by the largest extent of the robot, e.g. the radius of the robot. Inflation by the radius of the robot is easily accomplished by extending in all directions pixels of map 720 representing obstacles with a number of pixels corresponding to the radius of the robot. For example, in a 5 cm per pixel map for robots having radius 0.25 meter, 25 black (0) pixels may "padded" adjacent in all directions to each black (obstacle) pixels. Alternatively, obstacles may be padded by up to twice the radius of the robot to ensure unobstructed motion of the robot at all points on the robot.

Figure 16B:
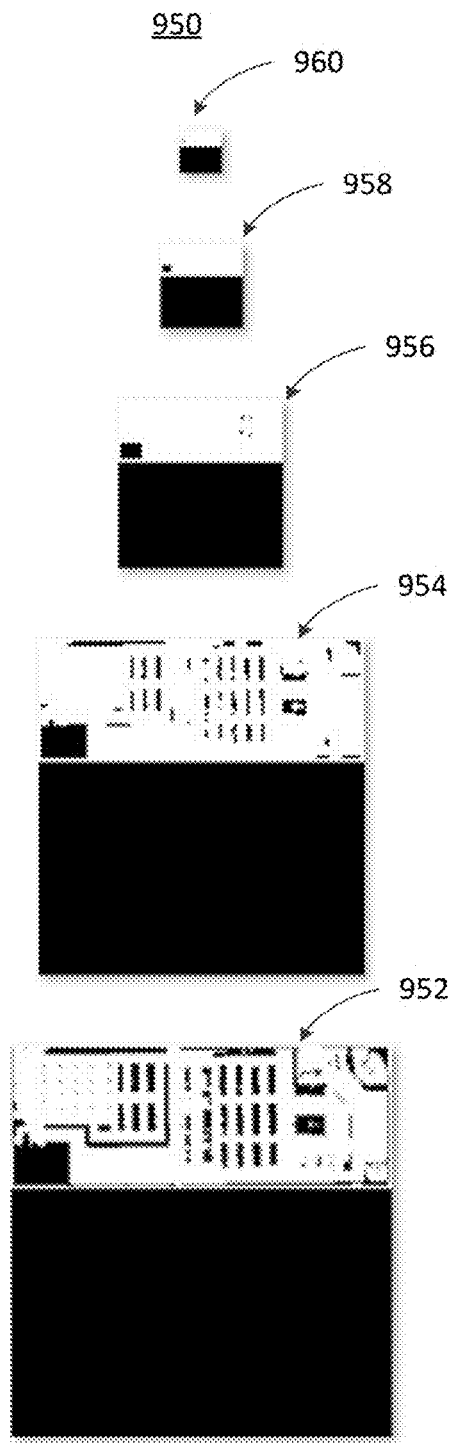

As illustrated in FIG. 16B, exclusion pyramid 950 includes a set of maps at successively lower resolutions, beginning at highest resolution exclusion map 952 at the base of the pyramid, to the lowest resolution exclusion map at the top. Construction of the exclusion pyramid begins with map 952 (representing the full map of the warehouse) being padded with zeroes (black) to form a square bitmap at the highest resolution of exclusion pyramid 950. Highest resolution exclusion map 952 is a square bitmap of a size and resolution equal to highest resolution matching map 912 as shown and described above for matching pyramid 910. Note that in the preferred embodiment, because no fuzzification is performed on the exclusion map, pixel values in exclusion maps are binary 0,1 where obstacles (in black) have been inflated by the radius of the robot.

As with the construction of the matching pyramid, construction of exclusion pyramid 950 proceeds by decimating map 952 into successively lower resolution maps (954, 956, 958, 960), with each lower resolution map derived by decimation of the next highest resolution map. For example, lower resolution exclusion map 954 is derived from the decimation of highest resolution exclusion map 952; exclusion map at lower resolution 956 is derived by decimating exclusion map 954 and so on, until only a single pixel lowest resolution exclusion map remains.

Figure 18C:
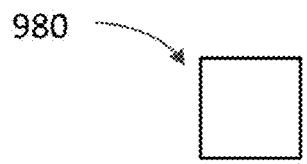
FIGS. 18A, 18B, and 18C depict decimation of a portion of an exclusion map from a higher resolution map to two lowest level resolutions of the exclusion pyramid.
Figure 18B:
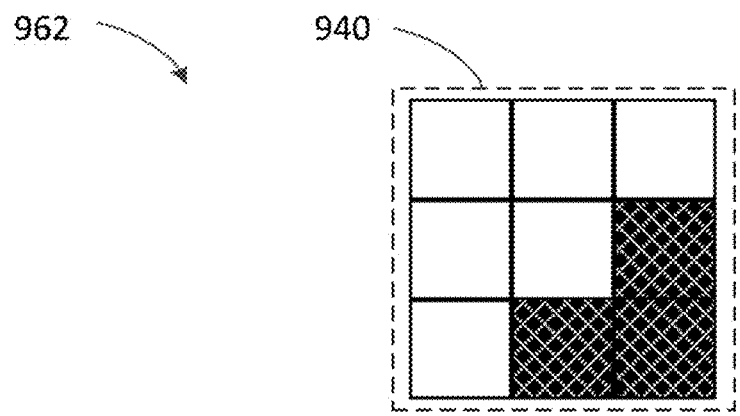
Figure 18A:
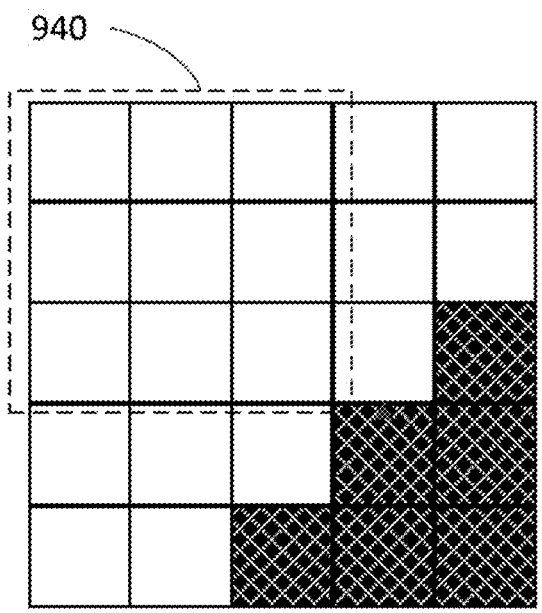

As illustrated in FIGS. 18A-C, decimation for the exclusion pyramid 950 continues identically to the manner of decimation for matching pyramid 910. As such, FIGS. 18A and 18B illustrate the decimation of a portion 960' of map 960 of exclusion pyramid 950 to produce the next lower resolution exclusion map 962. As window 940 passes over every second pixel in every other row of map 960' the maximum pixel value in the window is retained as the value of the corresponding pixel at the next lower resolution. Repeating the decimation at the next lower resolution continues until only a single pixel 980 remains.

Decimation at each successively lower resolution of the exclusion pyramid underestimates the likelihood of a scan match placing the robot in an obstacle, thus preventing the exclusion of valid pose candidates from consideration at lower resolutions of the pyramid. Equivalently, the manner of decimating the exclusion maps overestimates the likelihood of finding a pose for the robot in free space. The purpose and benefit of such overestimating will be made clear in the application of exclusion maps and the exclusion pyramid with M3RSM as further discussed below.

Find Pose

Returning to step 810 of FIG. 14, robot system 600 receives a laser-radar scan of the local environment and proceeds to find the pose best matching the received scan. Robot system 600 with received map and having constructed the matching and exclusion pyramids may then proceed to finding the pose of the robot.

Figure 19:
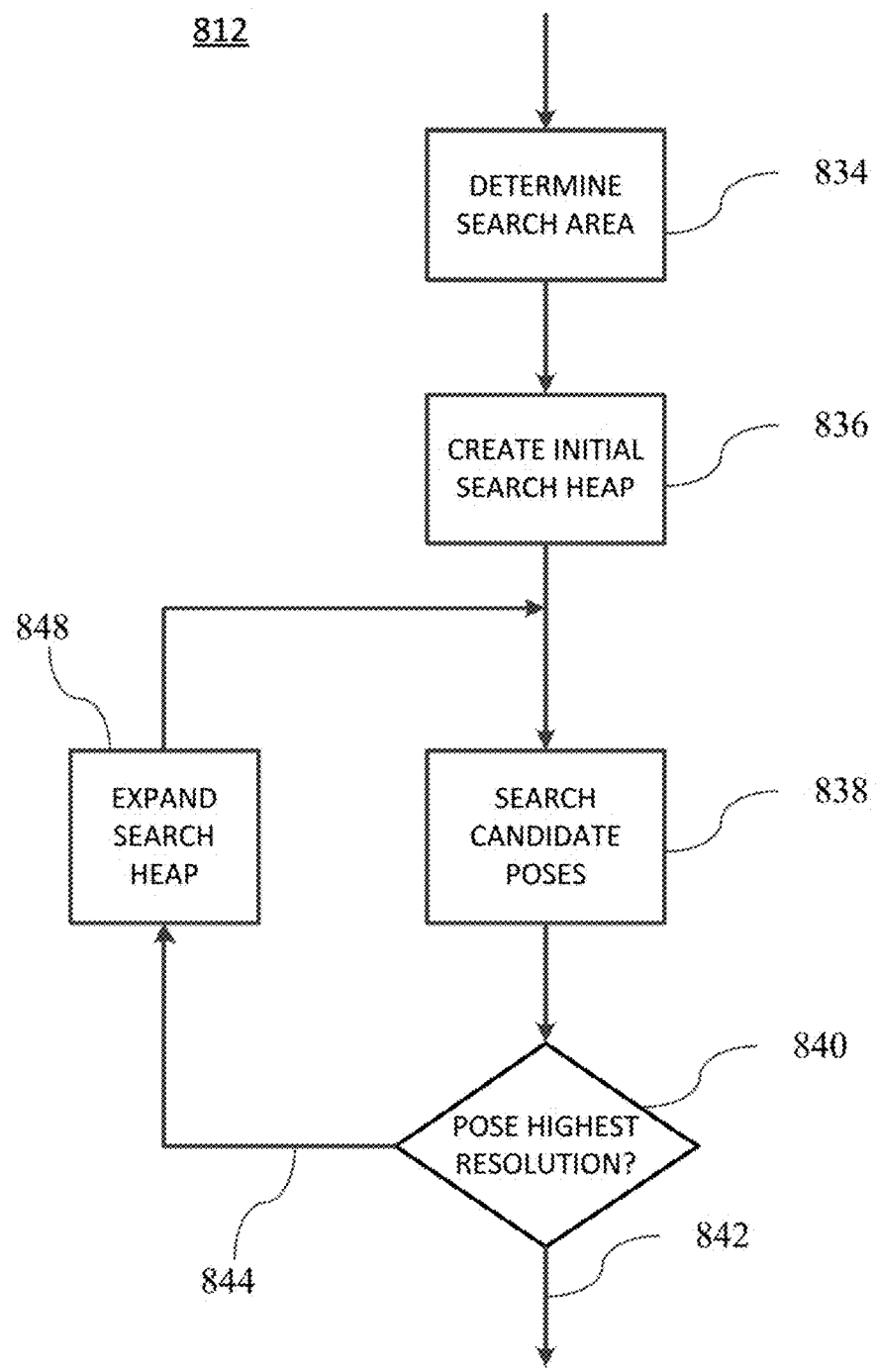
FIG. 19 illustrates the process of finding the pose of the robot based on an embodiment of M3RSM using the exclusion map pyramid.

Finding the pose of the robot is further described with reference to FIG. 19. Beginning at step 834, a search area is determined as the portion of the received map to be searched for candidate poses. In a first iteration, the search area may include the entire map. In a subsequent iteration, robot system 600 may estimate its pose in only a portion of the map. The pose for determining the search area may be estimated from a last known pose combined with sensor data such as drive train/wheel encoders and/or drive control information.

In a preferred embodiment, state estimation module 650 may fuse pose data with wheel encoder data and inertial sensor data to determine the robot's current pose, velocity, and estimated errors for each. The estimated pose thus bounds the search to a portion of the map, reducing the search space and decreases processing time for scan matching. The lower the uncertainty in the pose estimate, the smaller the search area over which scan matching may be required. The larger the uncertainty, the greater the search area over which scan matching may be required. One skilled in the art would understand that estimates of pose and determining the search area could be performed by various methods and parameters.

With reference again to FIG. 19, at step 836 robot system 600 creates an initial search space of candidate poses according to the determined search area. Preferably, the initial search space is a search heap containing search tasks, each search task comprised of one or more candidate poses, a matching map at one resolution of the matching pyramid, and a received scan decimated to the resolution of the matching map. In one embodiment, each search task defines a candidate pose at a translation and rotation for scan matching the received scan to a portion of the matching map. Alternatively, each search task may define candidate poses by a range of translations and rotations, where the rotation and/or decimation of the scan at a resolution is performed on demand and cached. When the search heap is first generated, the scan may be rotated for every rotation in the search heap and cached. When a scan at a particular resolution is needed for scan matching, the already-cached rotated scan may be retrieved from the cache along with its decimated version. Thus, where a search task with the same rotation and resolution needs the decimated and rotated scan for a different translation, the previously rotated and decimated scan can be retrieved from the cache saving computation time of repetitive point cloud operations.

Returning to FIG. 19, search candidate pose (step 838) proceeds until a best pose at a highest resolution of the matching pyramid is found (step 840). If the best pose selected is not at the highest resolution matching map (step 844), the search space is expanded (step 848) and the search of candidate poses (step 838) continues. If the best pose is at the highest resolution matching map, processing returns (step 842) to step 812 of FIG. 14 as previously described.

Search tasks on the search heap are ordered by the assignment of a computed upper bound on the maximum likelihood that a candidate pose matches the map at the matching pyramid map resolution for that search task. Techniques for efficiently creating and expanding the search heap and computing the upper bound on the maximum likelihood for search tasks in the heap can be found in Edwin Olson, "M3RSM: Many-to-many multi-resolution scan matching", as previously incorporated by reference above.

In conventional M3RSM, however, expanding the search heap includes adding search tasks to the heap with candidate poses that would localize the robot in or partially within an obstacle in the environment. Incorporating into M3RSM the above described exclusion pyramid, as will be shown, prevents expanding the search heap with such tasks, thereby eliminating the computational expense of evaluating invalid poses. Furthermore, by pruning a search task before adding it to the search heap, all search tasks at higher resolutions associated with the invalid pose are eliminated from consideration as well.

Figure 20:
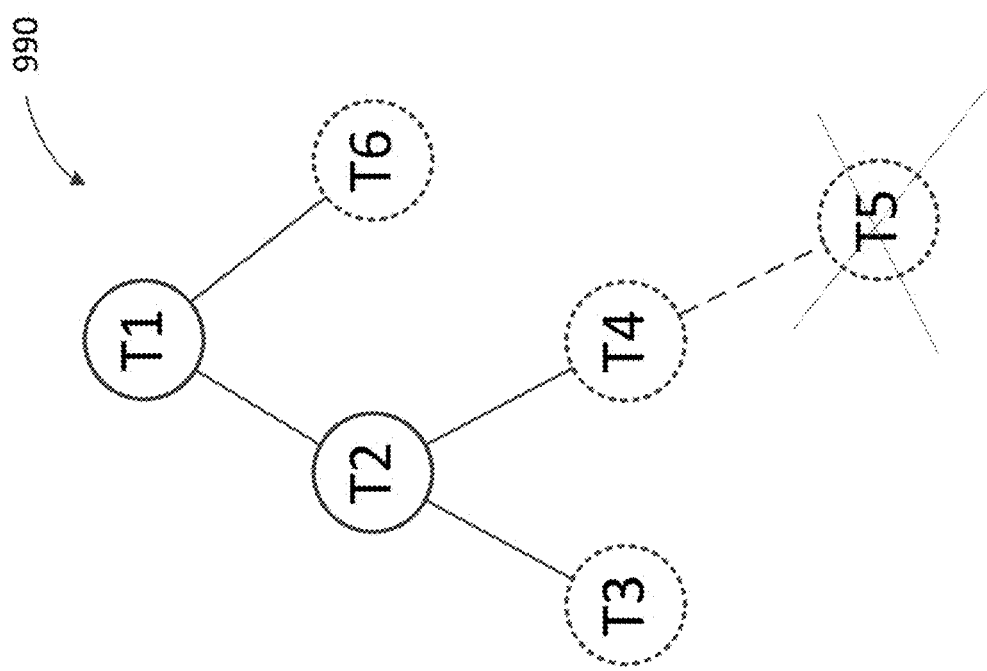

FIG. 20 illustrates the process of employing the exclusion pyramid to invalidate a candidate pose prior to creating and evaluating search tasks on the search heap that would localize the robot in an obstacle. As previously described, search heap 990 may contain tasks T1 and T2, each task comprising a laser-radar scan S, a matching map M at a resolution R of the matching pyramid, and a candidate translation and a range of rotations for scan S. Evaluation of task T1 finds a best candidate pose P by rotating and scan matching scan S to map M over a set of rotations. If resolution R is at the highest resolution of the matching pyramid, then pose P is the robot pose and step 812 of FIG. 19 is done. If resolution R is not at the highest resolution, then task T1 may be expanded at the next highest resolution R-1.

Expansion of the search heap from a search task at resolution R may add four new search tasks (e.g. T3-T6 in FIG. 20) from the matching map at resolution R-1 of the matching pyramid. The four new search tasks are created from the four-pixel square corresponding to the initial decimation of the map at resolution R-1 to the pose of the search task being expanded at resolution R. Each new search task would have one quarter of the translational range of the expanded search task. However, in an embodiment of the present invention, prior to creating the new search tasks, the exclusion map at resolution R-1 is queried at the location of candidate pose P of each new task. If the candidate pose at resolution R-1 would place the robot on a black pixel (obstacle) of the exclusion map at resolution R-1, then the expanded search task for that pose is eliminated, and not inserted into the search heap.

Figure 21:
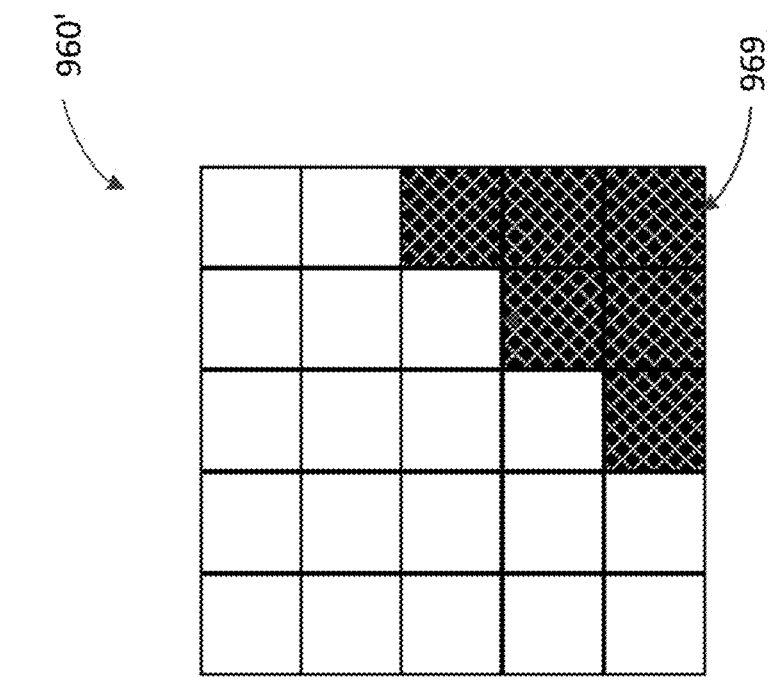
FIGS. 20 and 21 illustrate the process of searching candidate poses for a best pose at a highest resolution map of the matching pyramid.

For example, as depicted in FIG. 20, if expanding task T1 at resolution R into a new tasks T3-T6 at resolution R-1, the algorithm would locate candidate pose P of task T5 in pixel 969 of exclusion map 960 (a portion of which 960' is shown in FIG. 21), task T5 would not be added to the search heap. By pruning task T5 before adding it to the search heap, all search tasks that may have been created at pose P corresponding to pixel 969 at resolution R-2 and higher resolutions are eliminated as well because task T5 will never be evaluated (and thus not be expanded) in its corresponding location in the next highest resolution map.

Figure 22B:
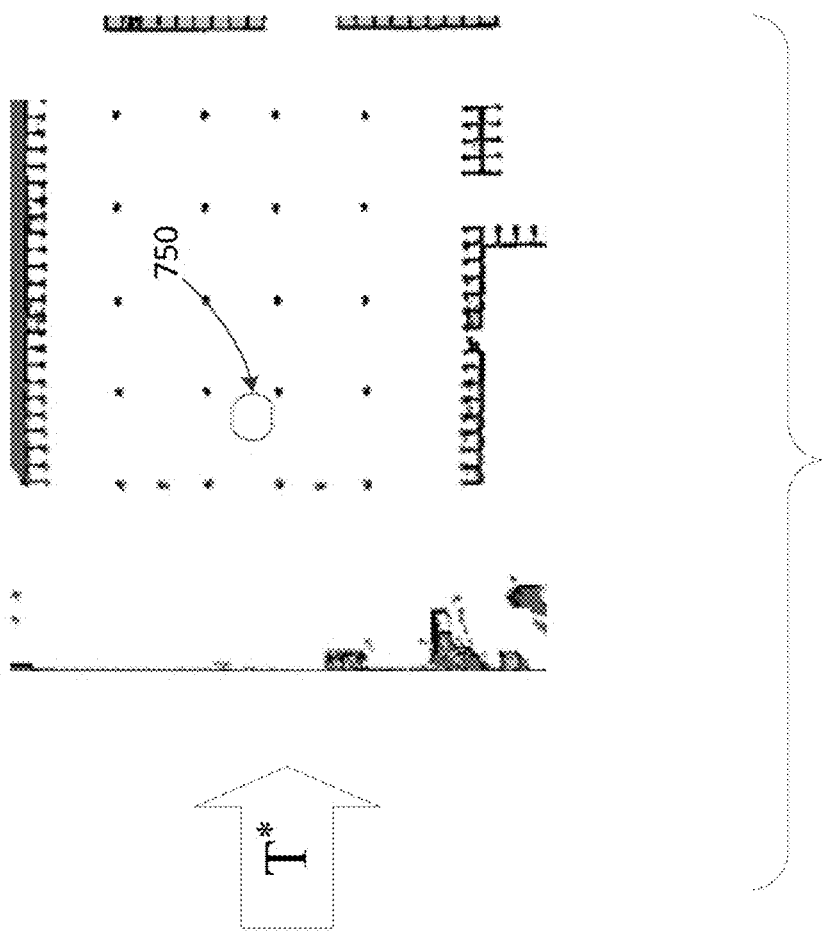
FIGS. 22A and 22B illustrate a best pose estimation with scan matching to find a translation of a misaligned (22A) scan to an aligned scan (22B).
Figure 22A:
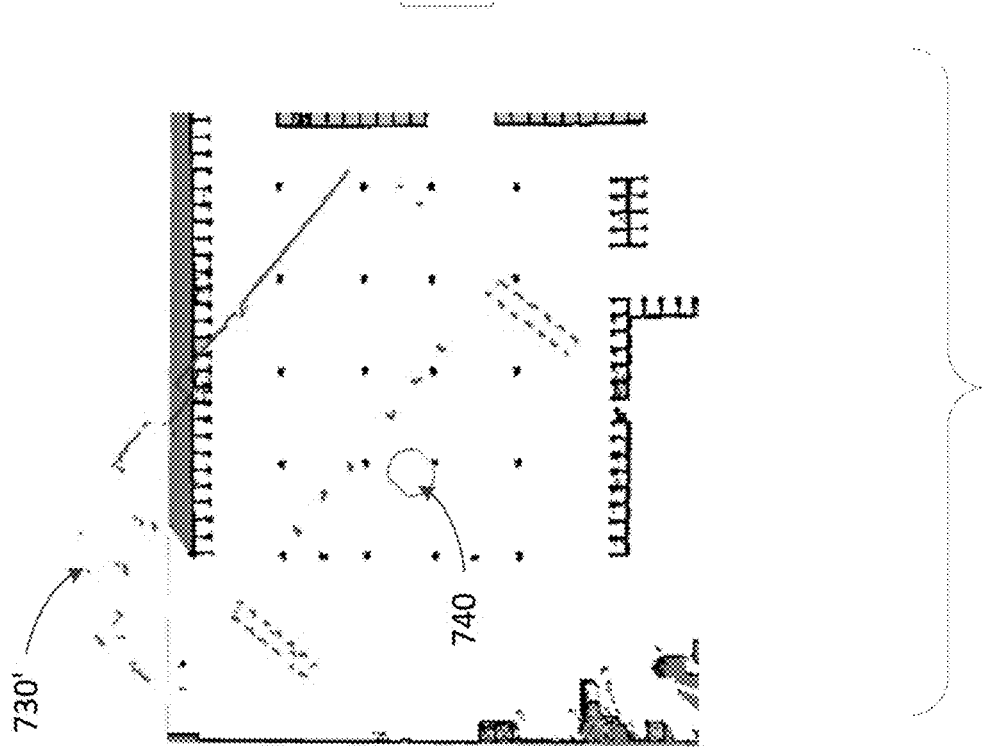

FIGS. 22A and 22B illustrate the finding of a "best pose" from the above described process. FIG. 22A shows local scan 730 and initial pose estimate 740. FIG. 21B shows local scan match translated from pose estimate 740 to a best pose 750 by a translation T* at a highest resolution matching map of the matching pyramid. Returning 750 from step 842 completes step 812 from FIG. 14, which proceeds as above to determine a next instantaneous velocity for moving the robot incrementally along the goal path.

While the foregoing description of the invention enables one of ordinary skill to make and use what is considered presently to be the best mode thereof, those of ordinary skill will understand and appreciate the existence of variations, combinations, and equivalents of the specific embodiments and examples herein. The above-described embodiments of the present invention are intended to be examples only. Alterations, modifications and variations may be effected to the particular embodiments by those of skill in the art without departing from the scope of the invention, which is defined solely by the claims appended hereto.

It should be understood that the present invention may be implemented with software and/or hardware. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." As will be appreciated by one skilled in the art, aspects of the invention may be embodied as a system, method or computer program product.

Aspects of the present invention are described with reference to flowcharts, illustrations and/or block diagrams of methods and apparatus (systems). The flowcharts and block diagrams may illustrate system architecture, functionality, or operations according to various embodiments of the invention. Each step in the flowchart may represent a module, which comprises one or more executable instructions for implementing the specified function(s). In some implementations, steps shown in succession may in fact be executed substantially concurrently. Steps may be performed by special purpose hardware-based systems that perform the specified functions or acts, or combinations of special purpose hardware and computer instructions.

Computer instructions for execution by a processor carrying out operations of the present invention may be written one or more programming languages, including object-oriented programming languages such as C#, C++, Python, or Java programming languages. Computer program instructions may be stored on a computer readable medium that can direct the robot system via the data processor to function in a particular manner, including executing instructions which implement the steps specified in a flowchart and/or system block diagram described herein. A computer readable storage medium may be any tangible medium that can contain, or store instructions for use by or in connection with the data processor. A computer readable medium may also include a propagated data signal with computer readable program code embodied therein.

The invention is therefore not limited by the above described embodiments and examples, embodiments, and applications within the scope and spirit of the invention claimed as follows.

What is claimed is:

1. A method for navigating a robot from a current pose to a goal pose, comprising:
   receiving, by a transceiver of the robot, a map representing obstacles and free space within an area for robot navigation;
   constructing, by a data processor of the robot, based on the received map, a matching map pyramid comprising a highest resolution matching map and a set of decimated matching maps at successively lower resolutions;
   constructing, by the data processor of the robot, based on the received map, an exclusion map pyramid comprising a highest resolution exclusion map and a set of decimated exclusion maps at successively lower resolutions, each exclusion map including at least one exclusion zone associated with an obstacle of the received map;
   receiving a goal pose for navigating a robot from its present location to the goal pose along a goal path;
   scanning, by a scanner of the robot, to generate a scan indicating free space and obstacles in proximity to the robot at its present location;
   finding the current pose of the robot; and
   moving the robot to a next pose on the goal path in the direction of the goal pose;
   wherein finding the current pose of the robot comprises:
      determining, by the data processor, a search area within the received map;
      creating a search heap comprising search tasks representing candidate poses at one or more resolutions of the matching map pyramid; and
      comparing the search tasks on the search heap to the scan and scoring the comparison of each search task to determine a best candidate pose,
      wherein if the best candidate pose is at the highest resolution matching map, the pose is selected as the current pose;
      wherein if the best candidate pose is not at the highest resolution matching map the search heap is expanded based on the best candidate pose at a next highest resolution matching map; and
      wherein the search heap is not expanded with search tasks with candidate poses that would localize the robot in an exclusion zone of an exclusion map at the next highest resolution exclusion map.

2. The method of claim 1, wherein the received map comprises a simultaneous localization and mapping (SLAM) map.

3. The method of claim 1, wherein creating the search heap and scoring the search tasks is performed by many-to-many multi-resolution scan matching (M3RSM).

4. The method of claim 1, wherein constructing the highest resolution matching map includes increasing the size of obstacles by a quadratic decay convolution filter.

5. The method of claim 1, wherein constructing the highest resolution exclusion map includes increasing the size of obstacles based on the radius of the robot.

6. The method of claim 1, wherein the decimating to construct each successively lower resolution of the matching map pyramid overestimates the scan match scoring in the next higher resolution matching map.

7. The method of claim 1, wherein the decimating to construct each successively lower resolution of the exclusion map pyramid underestimates the exclusions zones in the next higher resolution exclusion map.

8. The method of claim 7, wherein the underestimating of the exclusion zones at a lower resolution exclusion map and the not expanding search tasks localized in exclusions zones also prevents creating search tasks in exclusion zones at higher resolutions of the exclusion pyramid.

9. The method of claim 8, wherein the obstacles associated with the exclusion zones include one or more of walls, shelving, beams, bins, or charging stations.

10. A robot system, comprising
   a laser-radar scanner;
   a transceiver;
   a data processor; and
   a data storage device having instructions stored thereon for execution by the data processor to:
      receive a map representing obstacles and free space within an area for robot navigation;
      construct, based on the received map, a matching map pyramid comprising a highest resolution matching map and a set of decimated matching maps at successively lower resolutions;
      construct, based on the received map, an exclusion map pyramid comprising a highest resolution exclusion map and a set of decimated exclusion maps at successively lower resolutions, each exclusion map including at least one exclusion zone associated with an obstacle of the received map;
      receive a goal pose for navigating a robot from its present location to the goal pose along a goal path;
      scan, by the laser-radar scanner, to generate a scan indicating free space and obstacles in proximity to the robot at its present location;
      find the current pose of the robot; and
      move the robot to a next pose on the goal path in the direction of the goal pose;

wherein finding the current pose of the robot comprises:
determine a search area within the received map;
create a search heap comprising search tasks representing candidate poses at one or more resolutions of the matching map pyramid;
compare the search tasks on the search heap to the scan and score the comparison of each search task to determine a best candidate pose,
wherein if the best candidate pose is at the highest resolution matching map, the pose is selected as the current pose;
wherein if the best candidate pose is not at the highest resolution matching map the search heap is expanded based on the best candidate pose at a next highest resolution matching map; and
wherein the search heap is not expanded with search tasks with candidate poses that would localize the robot in an exclusion zone of an exclusion map at the next highest resolution exclusion map.

11. The system of claim 10, wherein the received map comprises a simultaneous localization and mapping (SLAM) map.

12. The system of claim 10, wherein creating the search heap and scoring the search tasks is performed by many-to-many multi-resolution scan matching (M3RSM).

13. The system of claim 10, wherein constructing the highest resolution matching map includes increasing the size of obstacles by a quadratic decay convolution filter.

14. The system of claim 10, wherein constructing the highest resolution exclusion map includes increasing the size of obstacles based on the radius of the robot.

15. The system of claim 10, wherein the decimating to construct each successively lower resolution of the matching map pyramid overestimates the scan match scoring in the next higher resolution matching map.

16. The system of claim 10, wherein the decimating to construct each successively lower resolution of the exclusion map pyramid underestimates the exclusions zones in the next higher resolution exclusion map.

17. The system of claim 16, wherein the underestimating of the exclusion zones at a lower resolution exclusion map and the not expanding search tasks localized in exclusions zones also prevents creating search tasks in exclusion zones at higher resolutions of the exclusion pyramid.

18. The system of claim 17, wherein the obstacles associated with the exclusion zones include one or more of walls, shelving, beams, bins, or charging stations.

19. A method for determining a current pose of a robot comprising:
receiving, by a transceiver of the robot, a map representing obstacles and free space within an area for robot navigation;
constructing, by a data processor of the robot, based on the received map, a matching map pyramid comprising a highest resolution matching map and a set of decimated matching maps at successively lower resolutions;
constructing, by the data processor of the robot, based on the received map, an exclusion map pyramid comprising a highest resolution exclusion map and a set of decimated exclusion maps at successively lower resolutions, each exclusion map including at least one exclusion zone associated with an obstacle of the received map;
scanning, by a scanner of the robot, to generate a scan indicating free space and obstacles in proximity to the robot at its present location;
determining, by the data processor, a search area within the received map;
creating a search heap comprising search tasks representing candidate poses at one or more resolutions of the matching map pyramid, wherein creation of the search heap includes eliminating search tasks associated with candidate poses located in the at least one exclusion zone from the search heap; and
comparing the search tasks on the search heap to the scan and scoring the comparison of each search task to determine the current pose.

* * * * *